US006944232B2

(12) United States Patent
Koga et al.

(10) Patent No.: US 6,944,232 B2
(45) Date of Patent: Sep. 13, 2005

(54) RECEIVING APPARATUS AND METHOD FOR DIGITAL MULTI-CARRIER TRANSMISSION

(75) Inventors: Hisao Koga, Chikushi-gun (JP); Nobutaka Kodama, Fukuoka (JP); Taisuke Konishi, Fukuoka (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 27 days.

(21) Appl. No.: 10/780,898

(22) Filed: Feb. 19, 2004

(65) Prior Publication Data

US 2004/0218695 A1 Nov. 4, 2004

(30) Foreign Application Priority Data

Feb. 19, 2003 (JP) .................................... P. 2003-041118
Oct. 3, 2003 (JP) .................................... P. 2003-345408

(51) Int. Cl.[7] ................................................ H04K 1/10
(52) U.S. Cl. .................................. 375/260; 375/240.19
(58) Field of Search ....................... 375/240.18, 240.19, 375/260, 376, 337; 370/208, 210, 281

(56) References Cited

U.S. PATENT DOCUMENTS

| | | | |
|---|---|---|---|
| 5,497,398 A | 3/1996 | Tzannes et al. | |
| 5,631,610 A | 5/1997 | Sandberg et al. | |
| 5,636,246 A | 6/1997 | Tzannes et al. | |
| 5,867,478 A | 2/1999 | Baum et al. | |
| 5,959,967 A | 9/1999 | Humphrey et al. | |
| 5,995,539 A | 11/1999 | Miller | |
| 6,111,919 A | 8/2000 | Yonge, III | |
| 6,172,993 B1 | 1/2001 | Kim et al. | |
| 6,236,726 B1 * | 5/2001 | Darveau | 379/417 |
| 6,278,685 B1 | 8/2001 | Yonge, III et al. | |
| 6,370,133 B1 * | 4/2002 | Kang et al. | 370/342 |
| 6,397,368 B1 | 5/2002 | Yonge, III et al. | |
| 6,438,186 B1 | 8/2002 | Strait | |
| 6,442,129 B1 | 8/2002 | Yonge, III et al. | |
| 6,466,629 B1 | 10/2002 | Isaksson et al. | |
| 6,532,256 B2 | 3/2003 | Miller | |
| 6,549,574 B1 * | 4/2003 | De Bart et al. | 375/240.05 |
| 6,553,534 B2 | 4/2003 | Yonge, III et al. | |
| 6,804,501 B1 * | 10/2004 | Bradley et al. | 455/138 |

FOREIGN PATENT DOCUMENTS

| | | |
|---|---|---|
| EP | 0913972 | 5/1999 |
| WO | 9955030 | 10/1999 |

OTHER PUBLICATIONS

B. Stantchev, et al,: "Burst Synchronization for OFDM-Based Cellular Systems With Separate Signaling Channel," Vehicular Technology Conference, 1998, VTC 98. 48th IEEE Ottawa, Ont, Canada May 18–21, 1998, New York, NY, USA, IEEE, US, XP010288089, ISBN: 0–7803–4320–4, pp. 758–762.

B. Yang, et al.; "Burst Frame Synchronization for OFDM Transmission in Multipath Fading Links," Vehicular Technology Conference, 1999, VTC 1999–Fall, IEEE VTS 50th Amsterdam, Netherlands Sep. 19–22, 1999, Piscataway, NJ, USA, IEEE, US, XP010352880, ISBN: 0–7803–5435–4, pp. 300–304.

(Continued)

Primary Examiner—Emmanuel Bayard
(74) Attorney, Agent, or Firm—Stevens, Davis, Miller & Mosher, LLP

(57) ABSTRACT

A receiving apparatus and method for performing carrier detection in a frequency domain for a digital wavelet multi-carrier transmission. A wavelet transform of received data is performed to output complex data and then the complex data is delayed for one sampling period. Subsequently, the delayed complex data and delayed complex data are divided. A number of the divided complex data present within each of plural quadrants on orthogonal coordinates is calculated and a maximum number of data present within one of the quadrants is selected and compared with a threshold in order to decide whether the received data is intended data.

25 Claims, 21 Drawing Sheets

OTHER PUBLICATIONS

Cheong et al., "Discrete Wavelet Transforms in Multi–Carrier Modulation," IEEE Globecom, The Bridge to Global Integration, IEEE Global Telecommunications Conference, XP000801553, vol. 5, pp. 2794–2799, 1998.

H. S. Maivar, "Signal Processing with Lapped Transforms," Artech House, Inc., ISBN 089006–467–9, pp. 204–217, 1992.

Partial International Search Report dated Jun. 25, 2004.

* cited by examiner

RECEIVING APPARATUS AND METHOD FOR DIGITAL MULTI-CARRIER TRANSMISSION

BACKGROUND OF THE INVENTION

1. Field of the Invention

The present invention relates to a receiving apparatus and method employing a multi-carrier transmission method utilizing real coefficient wavelet filter banks (Digital Wavelet Multi-Carrier transmission method, which is hereinafter called "DWMC transmission method").

2. Description of the Related Art

The transmission method involving digital modulation and demodulation processes utilizing real coefficient wavelet filter banks is a type of multi-carrier modulation method in which a plurality of digital modulated waves are synthesized from real coefficient filter banks to generate a transmission signal. In the method, PAM (Pulse Amplitude Modulation) is used as a method for modulating each carrier.

A data transmission method according to the DWMC transmission method will be described with reference to FIGS. 23 to 26.

As shown in FIG. 23, each subcarrier has an impulse response, and impulse responses of each of the plurality of subcarriers are transmitted in an overlapping relationship with each other. As shown in FIG. 24, each transmission symbol is formed by a time waveform that is a combination of impulse responses of a plurality of subcarriers.

The spectrum diagram shown in FIG. 25 illustrates an example of a spectrum transmitted according to the DWMC transmission method. A transmission frame (shown in FIG. 26) is formed by several tens to several hundreds of transmission symbols according to the DWMC transmission method. This transmission frame includes information data and preamble data which includes a Ramp symbol provided with a ramp treatment. The Ramp treatment can prevent the information and preamble data from becoming distorted in an amplifier.

In multi-carrier communications, a carrier detection and a symbol synchronization are often carried out on a same circuit simultaneously. However, in the DWMC transmission method in which wavelet transform is used, the manner in which to out the carrier detection and the symbol synchronization may not have been established. Accordingly, it may become problematic to improve the accuracy of the carrier detection and/or the symbol synchronization in the receiving apparatus. In addition, it may also become problematic to suppress the degradation of transmission efficiency when the carrier detection and/or the symbol synchronization are/is carried out in the receiving apparatus.

SUMMARY OF THE INVENTION

The present invention is made in view of the above-mentioned problems. An object of the present invention is to provide a receiving apparatus and method which can perform a carrier detection and/or a symbol synchronization in a frequency domain in the DWMC transmission method.

According to the invention, the receiving apparatus comprises a data transforming device utilizing a wavelet transform, a delay element, a subcarrier-pair generating device for generating subcarrier pairs, a phase-difference calculator for calculating phase-difference between subcarrier-pairs, and a decision unit for deciding received data based on the phase-difference calculated by the phase-difference calculator.

The invention provides a receiving apparatus and method which can perform a carrier detection in a frequency domain in the DWMC transmission method.

DETAILED DESCRIPTION OF THE PREFERRED EMBODIMENT

Preferred embodiments of the invention will be described with reference to FIGS. 1 to 27.

(First Embodiment)

Figure 1:
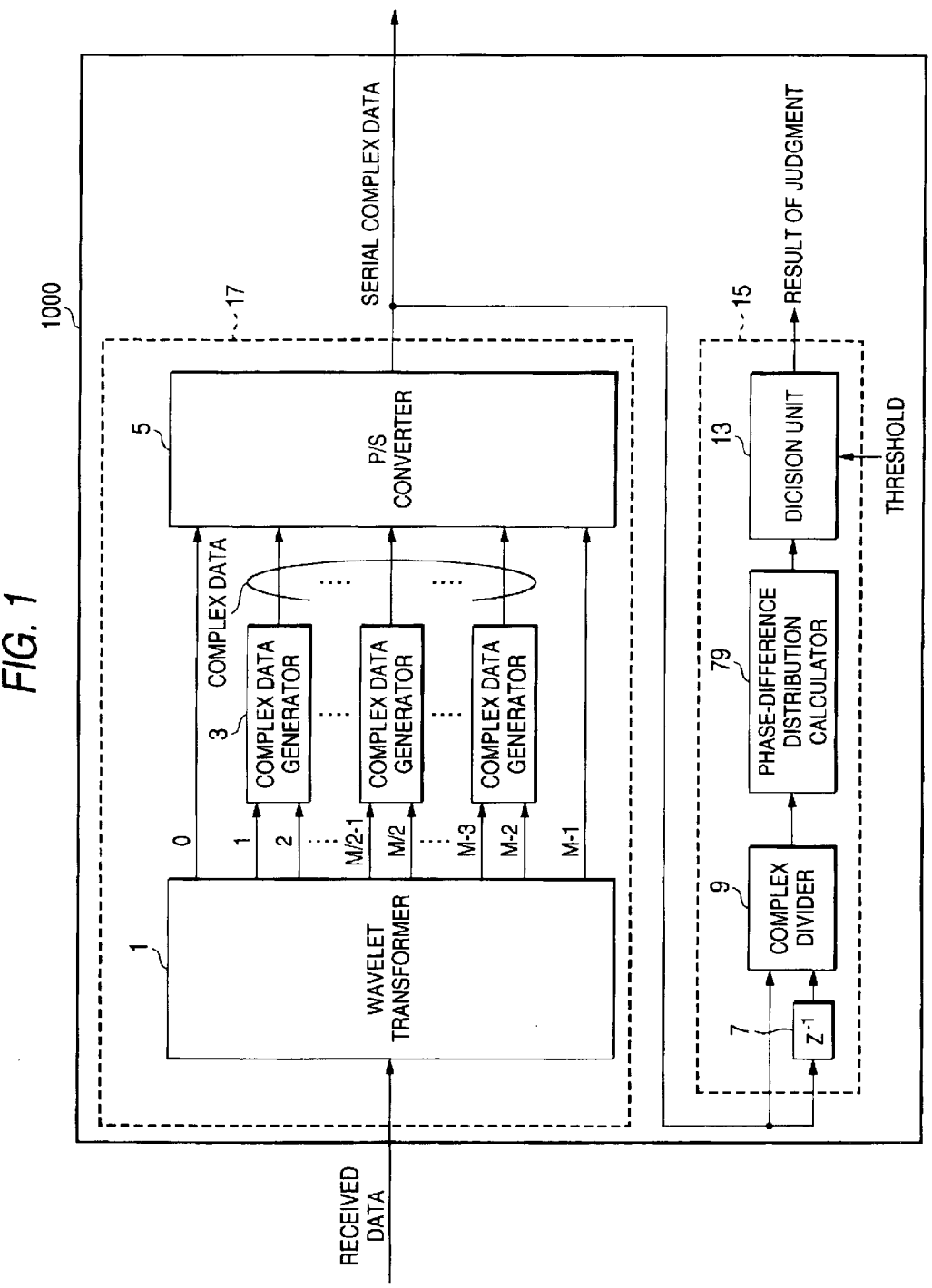
FIG. 1 is a block diagram of a wave detecting portion and a carrier detecting section that form a part of a receiving apparatus according to a first embodiment of the invention.

In FIG. 1, a receiving apparatus 1000 includes a carrier detector 15 and a wave detecting portion 17.

The wave detecting portion 17 includes a wavelet transformer 1, a complex data generators 3 and a parallel-to-serial (hereinafter P/S) converter 5. The wavelet transformer 1 is comprised of M real wavelet filters that are orthogonal to each other (M is a positive integer). The wavelet transformer 1 receives data, performs a wavelet transform to the received data, and then outputs M subcarriers (0 to M−1 in FIG. 1). The complex data generators 3 generate complex data from in-phase components (I channel) of the complex information and orthogonal components (Q channel) of the complex information: I channel are (2n−1)-th subcarriers from the wavelet transformer 1 and Q channel are 2n-th subcarriers from the wavelet transformer 1, wherein ($1 \leq n \leq M/2-1$). The complex data express complex subcarriers respectively. Moreover, the complex data generators 3 output the complex data to the P/S converter 5. The P/S converter 5 converts parallel complex data received from the complex data generators 5 to serial complex data.

The carrier detector 15 includes a delay element 7, a complex divider 9, a phase-difference distribution calculator 11 and a decision unit 13.

The delay element 7 receives the serial complex data and delays it for an intended period and outputs delayed complex data. The complex divider 9 receives the serial complex data and the delayed complex data, performs division between the two received data, and outputs divided complex data. The phase-difference distribution calculator 11 allots each divided complex data to four quadrants on a Cartesian coordinate and counts the number of data which exists in each quadrant on the Cartesian coordinate. Then, the phase-difference distribution calculator 11 selects the maximal number of data within one of the four quadrants and outputs the maximal number of data. The decision unit 13 compares data received from the phase-difference distribution calculator 11 and a threshold which is held in the decision unit 13, and outputs the result of the decision.

Figure 2:
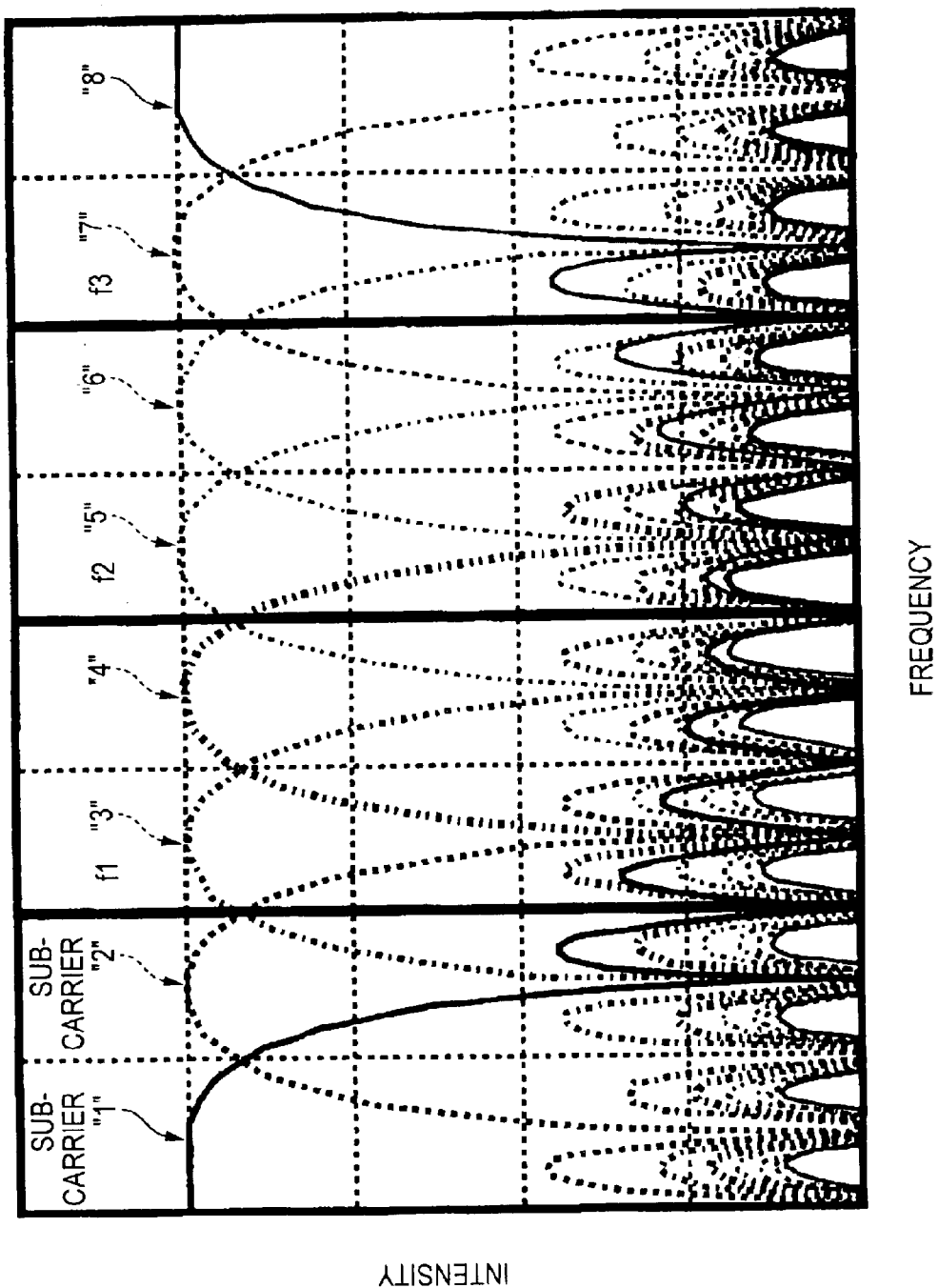
FIG. 2 is a graph showing a relationship between subcarriers and sine wave frequencies.
Figure 3:
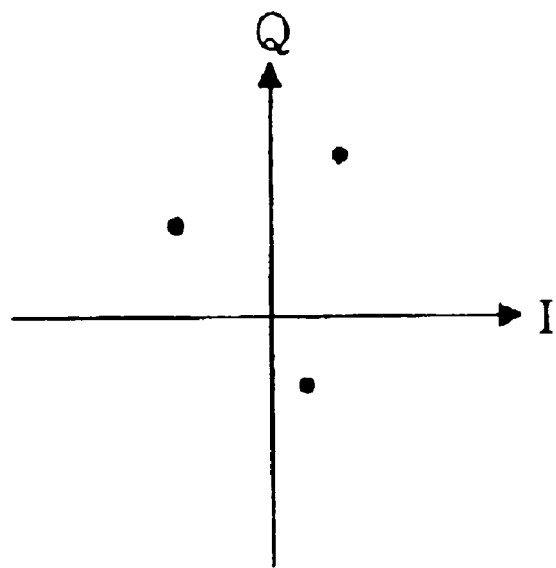
FIG. 3 is a diagram showing a distribution of received signals with a Cartesian coordinate in a case that intended (communication) signals do not exist.

An operation of the receiving apparatus 1000 having such a configuration will now be described with reference to FIGS. 2 and 3. It is assumed that the data sent from outside of the receiving apparatus 1000 is already known and is equal to "1". Furthermore, in the present embodiment, it is assumed that a composite wave originating from sine waves having frequencies indicated by the bold solid lines (f1,f2 and f3) in FIG. 2 is input to the receiving apparatus and that the sine waves have phases Φ1, Φ2 and Φ3, respectively. At this time, each sine wave is in an arbitrary phase "Φn" (n=1, 2 or 3) in the range from −π to π.

First, in the wave detecting portion 17, a wavelet transform is performed on the received data using the wavelet transformer 1. Then the wavelet transformer 1 outputs M subcarriers (the subcarriers being numbered from 0 to M−1). Then, all of subcarriers except subcarrier #0 and subcarrier #(M−1) are input to the complex data generators 3. At this time, (2n−1)-th and 2n-th subcarriers ($1 \leq n \leq M/2-1$) from the wavelet transformer 1 are cos(Φn) and sin(Φn), respectively, of sine waves having frequencies fn in FIG. 2. The complex data generators 3 generate complex subcarrier data including a real part that is constituted by the cos(Φn) and an imaginary data part that is constituted by the sin(Φn) and output the complex subcarrier data to the P/S converter 5. Next, the P/S converter 5 receives, in a parallel manner, the subcarrier #0 and the subcarrier #(M−1) from the wavelet transformer 1 and the complex subcarrier data from the complex data generators 3. Then, the P/S converter 5 converts the parallel data to serial data beginning at the top in FIG. 1. Then, the P/S converter 5 outputs the serial complex data from the wave detecting portion 17.

As described above, the wave detecting portion 17 converts the received data to the serial complex data through the wavelet transformer 1, the complex data generators 3 and the P/S converter 5, and then the wave detecting portion 17 outputs the serial complex data to the carrier detector 15.

Figure 4:
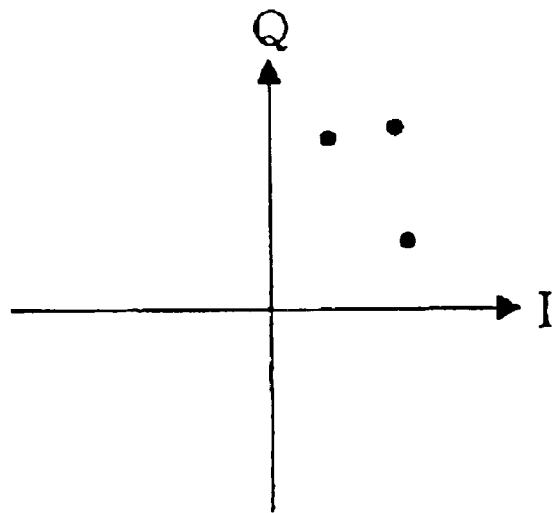
FIG. 4 is a diagram showing a distribution of received signals with a Cartesian coordinate in a case that intended (communication) signals exist.

Next, the serial complex data from the wave detecting portion 17 is inputted to both the delay element 7 and the complex divider 9 in the carrier detector 15. The delay element 7 causes the serial complex data to be delayed for one sampling period and outputs the delayed complex data to the complex divider 9. The complex divider 9 receives both the serial complex data and the delayed complex data. The complex divider 9 then performs division between the serial complex data and the delayed complex data and outputs the divided complex data to the phase-difference distribution calculator 11. In the present embodiment, the divided complex data expresses phase differences between the complex subcarriers serially. The phase-difference distribution calculator 11 calculates the phase-differences and allots each divided complex data to four quadrants on a Cartesian coordinate and counts the number of data in each quadrant on the Cartesian coordinate. FIG. 3 is a diagram showing the distribution of the receiving signals on the Cartesian coordinate for a case in which intended (communication) signals do not exist. FIG. 4 is a diagram showing the distribution of the received signals on the with Cartesian coordinate for a case in which intended (communication) signals exist. Assuming the existence of Additive White Gaussian Noise (hereinafter AWGN), there is only background noise when the intended data does not exist in the data received by the receiving apparatus 1000. As a result, the phase differences between subcarriers distribute randomly on the Cartesian coordinate as shown in FIG. 3. On the contrary, when the intended data exist in the data received by the receiving apparatus 1000, the phase differences between subcarriers distribute within a particular region such as, for example, in a quadrant on the Cartesian coordinate as shown in FIG. 4 (especially with low noise). Next, the phase-difference distribution calculator 11 selects the maximal number of data within one of the four quadrants and outputs the maximal number of data to the decision unit 13. The decision unit 13 compares the maximal number received from the phase-difference distribution calculator 11 and a threshold which is held in the decision unit. If the maximal number is larger than the threshold, then the decision unit 13 decides that the received data includes intended data. On the other hand, if the maximal number is smaller than the threshold, the decision unit 13 decides that the received data does not include intended data. The decision unit 13 outputs the result of the decision to a controller (not shown) of the receiving apparatus 1000. The controller sends the received data to a demodulator and/or modulator (Both are not shown) corresponding to the result of the decision.

The above-described configuration makes it possible to obtain complex information (complex data) with a smaller amount of calculation. In addition, it is possible to perform, in a frequency region, a carrier detection which determines whether intended data exists using a distribution of phase-differences between carriers.

While the present embodiment employs (M/2−1) complex data generators 3, it can be carried out using a single complex data generator by performing a parallel-to-serial conversion of outputs from the wavelet transformer 1 and performing timing control such that (2n−1)-th and 2n-th of the serial data are input to the complex data generator 3. In addition, the carrier detector in the present embodiment can be employed with a multi carrier receiving apparatus with Fast Fourier Transform that can handle the complex data.

Figure 27:
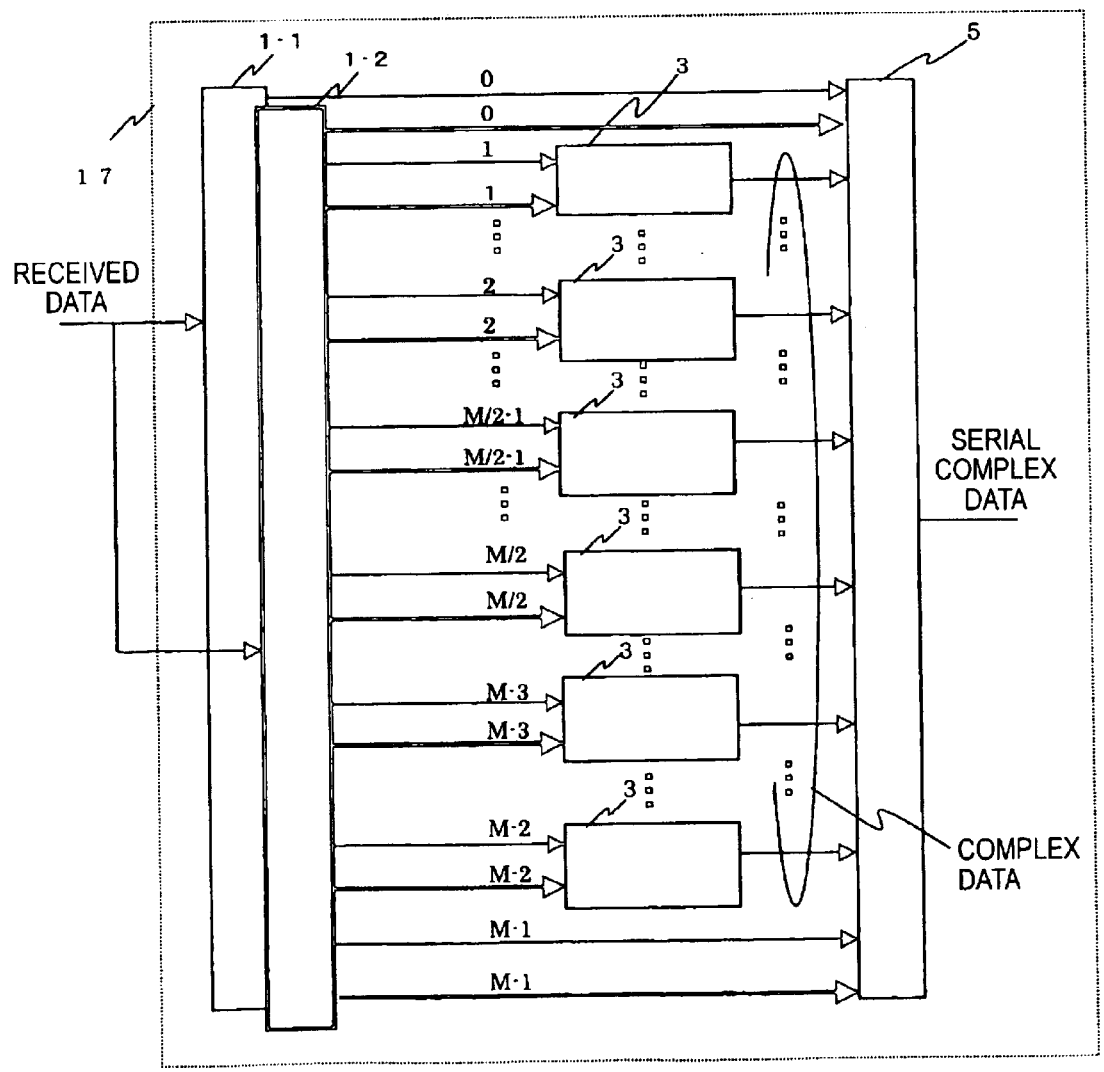
FIG. 27 illustrates another embodiment of the invention.

While the present embodiment employs one wavelet transformer 1, it can be carried out using a plurality of wavelet transformers as shown. As shown in FIG. 27, the wave detecting portion 17 has two wavelet transformers 1-1 and 1-2. The wavelet transformer 1-1 and 1-2 have same configurations with the wavelet transformer 1 described in the first embodiment. The wavelet transformer 1-1 and 1-2 receive data, and output M subcarriers, respectively. (0 to M−1 in FIG. 27) The complex data generators 3 receive subcarriers from the wavelet transformer 1-1 and 1-2, and generate complex data. M-th complex generator receives M-th subcarriers from the wavelet transformer 1-1 and 1-2. The above-described configuration makes it possible to improve the accuracy of carrier detection and/or symbol synchronization as the number of serial complex data that is population parameter of carrier detection and/or symbol synchronization doubles in this configuration.

(Second Embodiment)

A receiving apparatus of the present embodiment has the same configurations with the receiving apparatus of the first embodiment except for the phase-difference distribution calculator. Accordingly, the phase-difference distribution calculator will be described in detail in the present embodiment.

Figure 5:
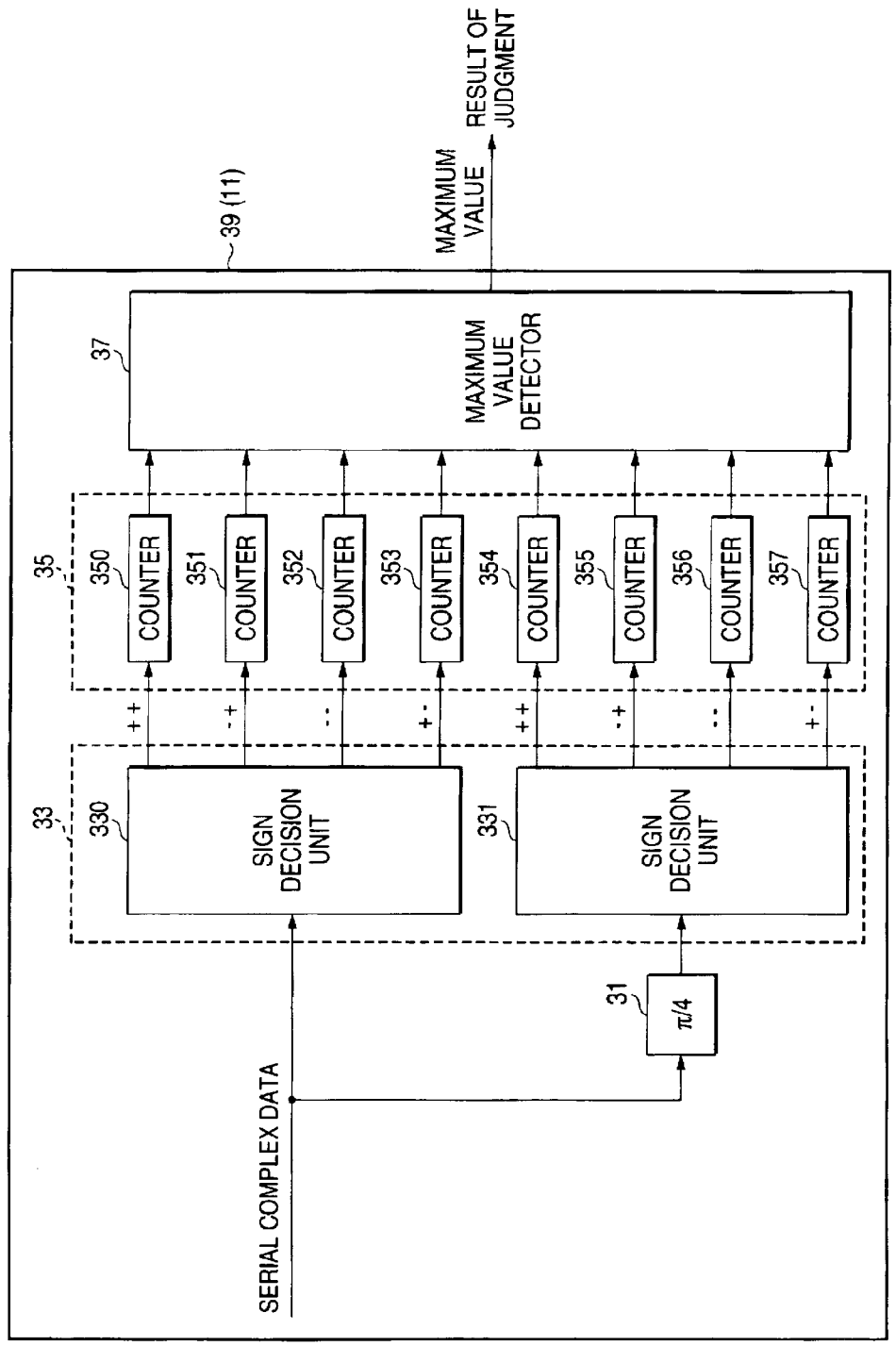
FIG. 5 is a block diagram of a phase-differential distribution calculator in a receiving apparatus according to a second embodiment of the invention.

As shown in FIG. 5, the phase-difference distributor calculator 39 (which is described as the phase-difference distributor calculator 11 in FIG. 1) includes a phase shifter 31, a sign decision unit 33, a counter 35, and a maximum value detector 37.

The phase shifter 31 shifts a phase of a part of the divided complex data received from the complex divider 9 by π/4. The sign decision unit 33 decides the particular quadrant in which the divided complex data is located in accordance with a sign of each of the divided complex data. In this embodiment, there are two sign decision units 330 and 331. The counter 35 counts the number of the complex data in each of quadrants. In this embodiment, there are eight counters 350 to 357. The maximum value detector 37 detects the maximum value from the numbers counted by the counters 35.

Figure 6:
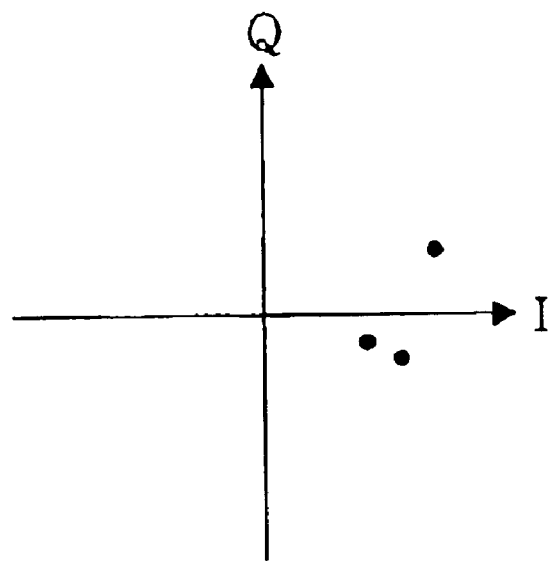
FIG. 6 is a diagram showing a distribution of complex signals put into a phase-difference distribution calculator.
Figure 7:
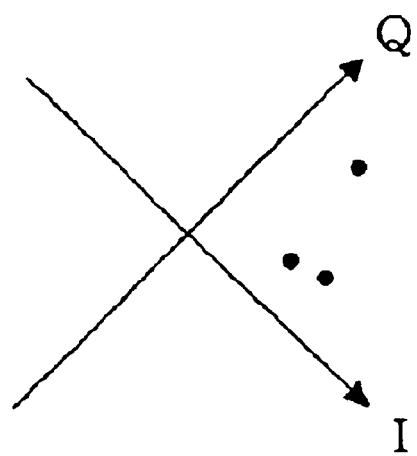
FIG. 7 is a diagram showing a distribution of complex signals put into a phase-difference distribution calculator with a π/4 phase shift by the condition of FIG. 6.

An operation of the phase-difference distribution calculator 39 having such a configuration will now be described with reference to FIGS. 6 and 7. It is assumed that the data sent from outside of the receiving apparatus 1000 is already known and has the same information, for example all "1". FIG. 6 is a diagram showing a distribution of complex data put into a phase-difference distribution calculator. FIG. 7 is a diagram showing the distribution of complex data put into a calculator of phase difference distribution with a phase shift of π/4 by the condition of FIG. 6.

Figure 9:
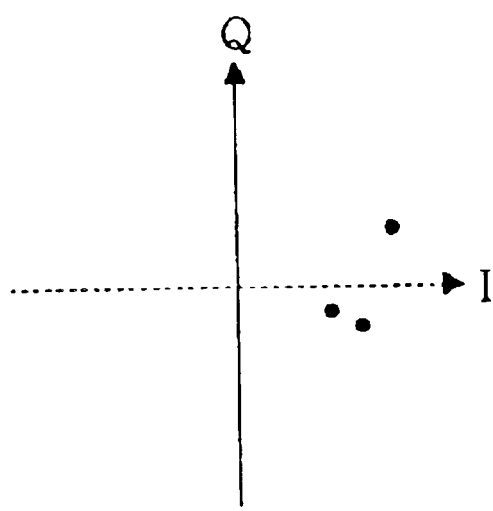
FIG. 9 is a diagram showing a sign-distribution of an in-phase signal decided by a decision unit.
Figure 10:
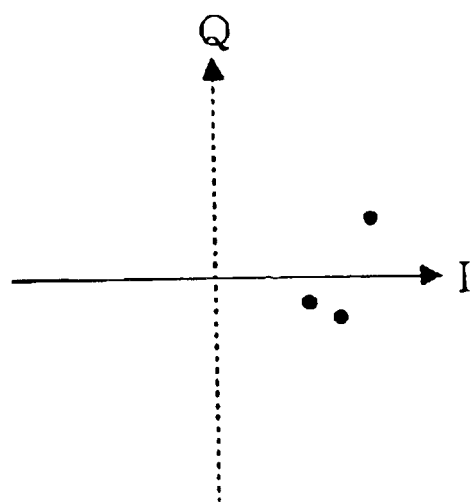
FIG. 10 is a diagram showing a sign-distribution of an orthogonal signal decided by a decision unit.

In this embodiment shown in FIGS. 9 and 10, the phase-differential distribution calculator 53 receives three complex data from the complex divider 9. The sign decision unit 330 receives each complex data directly from the complex divider 9.

The sign decision unit 330 receives three complex data from the complex divider 9, and decides signs of "A" and "B" of the complex data (A+Bi). When A and B are positive, the sign decision unit 330 decides that the complex data point is in the first quadrant, and outputs sign data to the counter 350. When A is negative but B is positive, the sign decision unit 330 decides that the complex data point is in the second quadrant, and outputs sign data to the counter 351. When A and B are negative, the sign decision unit 330 decides that the complex data point is in the third quadrant, and outputs sign data to the counter 352. When A is positive but B is negative, the sign decision unit 330 decides that the complex data point is in the fourth quadrant, and outputs sign data to the counter 353. The counters 350 to 353 count each number of the sign data sent from the sign decision unit 330. That is, the counters 350 to 353 count the number of the complex data points in each of the quadrants, and output the result to the maximal value detector 37. In this embodiment shown in FIG. 6, one complex data point is in the first quadrant and two complex data points are in the fourth quadrant, so the sign decision unit 330 outputs one sign data to the counter 350 and two sign data to the counter 353. Next, the counters 350 to 353 count each number of the sign data sent from the sign decision unit 330, and output the data of "1", "0", "0" and "2", respectively, to the maximal value detector 37.

The sign decision unit 331 receives three phase-shifted complex data via the phase shifter 31 from the complex divider 9, and decides signs of "A" and "B" of the those phase-shifted complex data (A+Bi). In this embodiment, the phase of the phase-shifted complex data is shifted by π/4 to the phase of the complex data. That is, the coordinate rotates on the complex plane by π/4 as shown in FIG. 7. When A and B are positive, the sign decision unit 331 decides that the phase-shifted complex data point is in the first quadrant, and outputs sign data to the counter 354. When A is negative but B is positive, the sign decision unit 331 decides that the phase-shifted complex data point is in the second quadrant, and outputs sign data to the counter 355. When A and B are negative, the sign decision unit 331 decides that the phase-shifted complex data point is in the third quadrant, and outputs sign data to the counter 356. When A is positive but B is negative, the sign decision unit 331 decides that the phase-shifted complex data point is in the fourth quadrant, and outputs sign data to the counter 357. The counters 354 to 357 count each number of the sign data sent from the sign decision unit 331. That is, the counters 354 to 357 count the number of the phase-shifted complex data points in each of the quadrants, and output the result to the maximal value detector 37. In this embodiment shown in FIG. 7, three complex data point are in the fourth quadrant, so the sign decision unit 331 outputs three sign data to the counter 357. Next, the counters 354 to 357 count each number of the sign data sent from the sign decision unit 331, and output the data of "0", "0", "0" and "3" to the maximal value detector 37, respectively.

Then, the maximal value detector 37 detects the maximal number from among each of the numbers of the complex data points sent from the counters 350 to 357, and outputs the maximal value to the decision unit 13.

Thus, the phase-difference distribution calculator 39 can precisely detect the maximum value for a case in which the complex data points concentrate near the I-axis and/or the Q-axis. Furthermore, though there are 4 counters 35 in accordance with each of the sign decision units 33 as shown in FIG. 5, a configuration using 3 counters 35 in accordance with each of the sign decision units 33 is also possible.

The above-described configuration makes it possible to detect intended (communication) signals for a case in which the complex data concentrate in a particular quadrant.

(Third Embodiment)

A receiving apparatus of the present embodiment also has the same configurations with the receiving apparatus of the first embodiment except for the phase-difference distribution calculator. Accordingly, the phase-difference distribution calculator will be described in detail in the present embodiment.

Figure 8:
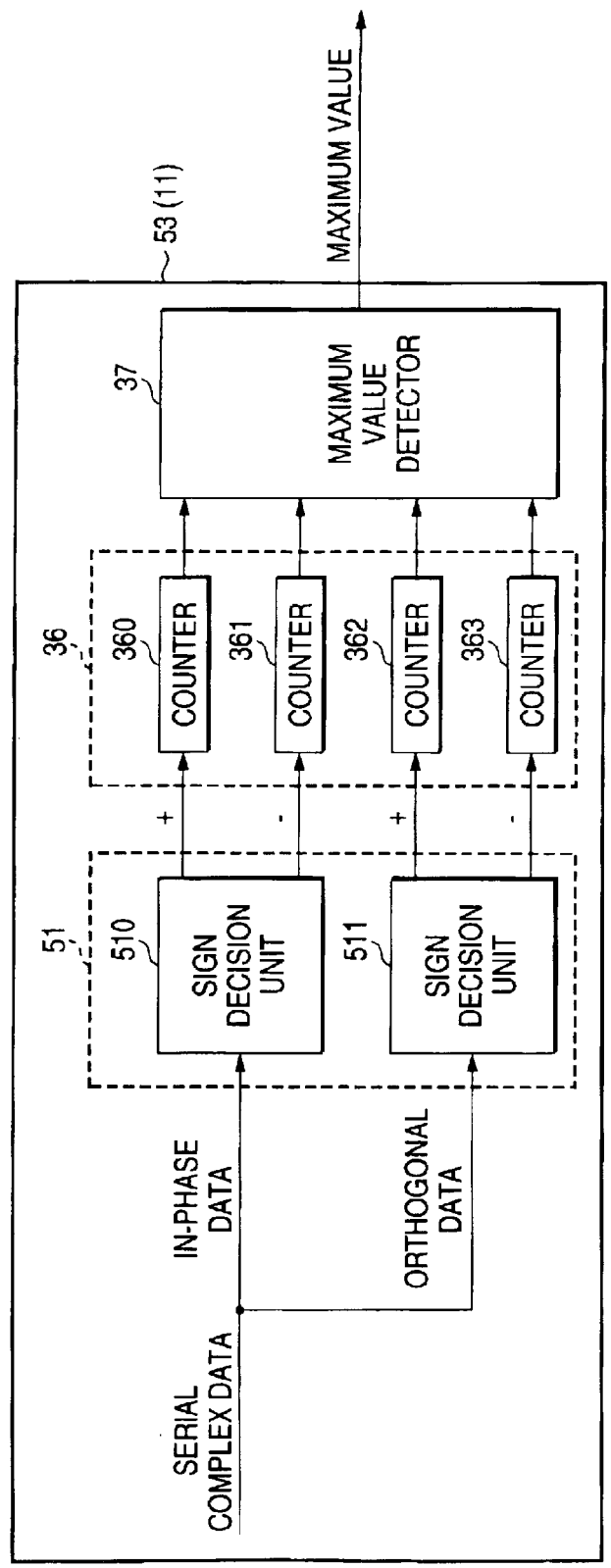
FIG. 8 is a block diagram of a phase-differential distribution calculator in a receiving apparatus according to a third embodiment of the invention.

In FIG. 8, a phase-differential distribution calculator 53 includes a sign decision unit 51, a counter 36, and a maximal value detector 37. In this embodiment, there are two sign decision units 510 and 511, four counters 360 to 363 and the maximal value detector 37 in the phase-difference distribution calculator 53, respectively. The sign decision unit 510 receives an in-phase signal in the complex data, and the sign decision unit 511 receives an orthogonal signal in the complex data. Each of counters 360 to 363 counts each number of sign data output from the sign decision unit 510 and 511. The maximal value detector 37 compares the outputs from each of the counters 360, 361, 362 and 363, and detects the maximal value among those outputs.

An operation of the phase-difference distribution calculator 53 having such a configuration will now be described with reference to FIGS. 8, 9 and 10. It is assumed that the data sent from outside of the receiving apparatus 1000 is already known and has the same information, for example all "1". FIG. 9 is a diagram showing the sign-distribution (3 data in the pulse side in this embodiment) of an in-phase signal decided by a decision unit. FIG. 10 is a diagram showing a sign-distribution (two data in the minus side and one data in the plus side in this embodiment) of an orthogonal signal decided by a decision unit. In this embodiment shown in FIGS. 9 and 10, the phase-differential distribution calculator 53 receives three complex data from the complex divider 9. Each of the complex data includes in-phase data and orthogonal data. The in-phase data is input to the sign decision unit 510, while the orthogonal data is input to the sign decision unit 511. The sign decision unit 510 decides each of the signs (positive or negative) of the in-phase data. The sign decision unit 510 outputs the sign data to the counter 360 or the counter 361 depending on whether the sign is positive or negative, respectively. The sign decision unit 511 also outputs the sign data to the counter 362 or the counter 363 depending on whether the sign is positive or negative, respectively. Each of the counters 360 to 363 counts the number of the sign data, and outputs each of the number data to the maximal value detector 37. Then, the maximal value detector 37 receives the number data from each of the counters 360 to 363, compares all of the number data, detects the maximal value of the number data, and then outputs the maximal value to the decision unit 13.

The above-described configuration makes it possible to precisely detect the maximal value when a distribution of the complex data is concentrated across the I or Q-axis. Accordingly, it is easier to decide the presence of the intended (communication) data in the receiving apparatus. Furthermore, an area located on the complex plane in this embodiment used to detect the number of the complex data is twice as large as the area of second embodiment. In addition, though there are two counters in accordance with one sign decision unit, the present invention can be carried out using one counter in accordance with one sign decision unit. Accordingly, this configuration allows for simplifying a structure of the phase-difference distribution calculator.

(Fourth Embodiment)

Figure 11:
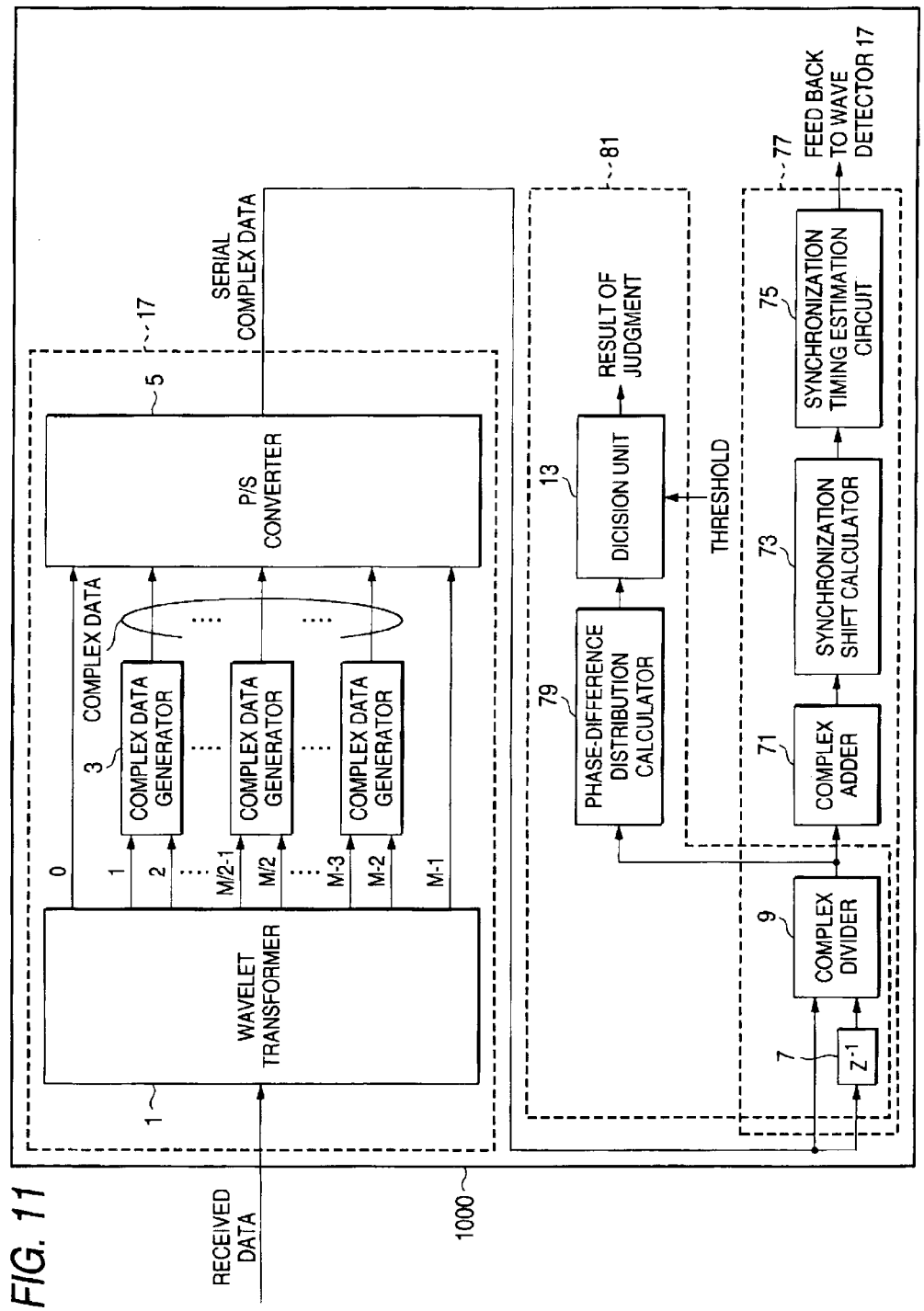
FIG. 11 is a block diagram of a wave detecting portion, a carrier detector and a symbol synchronizing circuit that form a part of a receiving apparatus according to a forth embodiment of the invention.

In FIG. 11, the receiving apparatus 1000 includes a wave detecting portion 17, a symbol synchronizing circuit 77 and a carrier detector 81. The wave detecting portion of the present embodiment has the same configurations as the wave detecting portion of the first embodiment. In addition, the wave detecting portion 17 and the carrier detector 81 of the present embodiment have the same configurations as the wave detecting portion of the first embodiment except for the phase-difference distribution calculator 79. Accordingly, detailed explanations about the wave detecting portion 17 and the carrier detector 81 are omitted in this embodiment.

In the carrier detector 81, any configurations of the phase-difference distribution calculator 11,39 and 53 described in embodiments 1 to 3, respectively, can be used as the phase-difference distribution calculator 79.

The symbol synchronizing circuit 77 includes a delay element 7, a complex divider 9, a complex adder 71, a synchronization shift calculator 73 and a synchronization timing estimation circuit 75. As shown in FIG. 11, the delay element 7 and the complex divider 9 are shared by the carrier detector 81 and the symbol synchronizing circuit 77 in this embodiment. The complex adder 71 accumulates the complex data from the complex divider 9.

An operation of the receiving apparatus 1000 having such a configuration will now be described with reference to FIG. 11. It is assumed that the data sent from outside of the receiving apparatus 1000 is already known and has the same information, for example all "1".

Operations of the wave detecting portion 17 and the carrier detector 81 are the same as the operations described in the first embodiment. The symbol synchronizing circuit 77 receives the serial complex data outputted by the wave detecting portion 17. At this time, the values of all outputs from the wave detecting portion 17 are equal when the symbols are synchronized at an accurate timing. When the symbols are not synchronized at an accurate timing, the outputs are at a value that reflect phase rotations represented by "$2\pi fc\cdot\tau$" depending on the degrees "$\tau$" of the shifts and the frequencies "fc".

Next, the delay element 7 and the complex divider 9 perform complex division between adjacent subcarriers to calculate phase differences on the complex coordinates. As frequency intervals "fi" between pairs of adjacent subcarriers are all equal, all of the phase differences (complex value) have the same value of "$2\pi fi\cdot\tau$" (in practice, their values deviate from "$2\pi fi\cdot\tau$" under the influence of the transmission path). The phase differences between subcarriers are cumulatively added by the complex adder 71 to obtain an average value ($\theta m$) of the phase differences, and the synchronization shift calculator 73 obtains synchronization shifts "$\tau$" from the frequency intervals "fi" and the average subcarrier phase difference "$\theta m$". The results are supplied to the synchronization timing estimation circuit 75 to provide feedback of the synchronization timing to the wave detecting portion 17.

The above-described configuration makes it possible to simplify the structure of the circuit of the carrier detector 81 and the symbol synchronization circuit 77 and to reduce the transitional period from the carrier detection to the symbol synchronization. For example, when the DWMC communication is carried out using a wavelet with a four symbol length, the time between the carrier detection and the symbol synchronization can be shortened for the time corresponding to a three symbol length.

In addition, the carrier detector 81 and the symbol synchronization circuit 77 in the present embodiment can be employed with a multi carrier receiving apparatus using Fast Fourier Transform that can handle the complex data.

(Fifth Embodiment)

Figure 12:
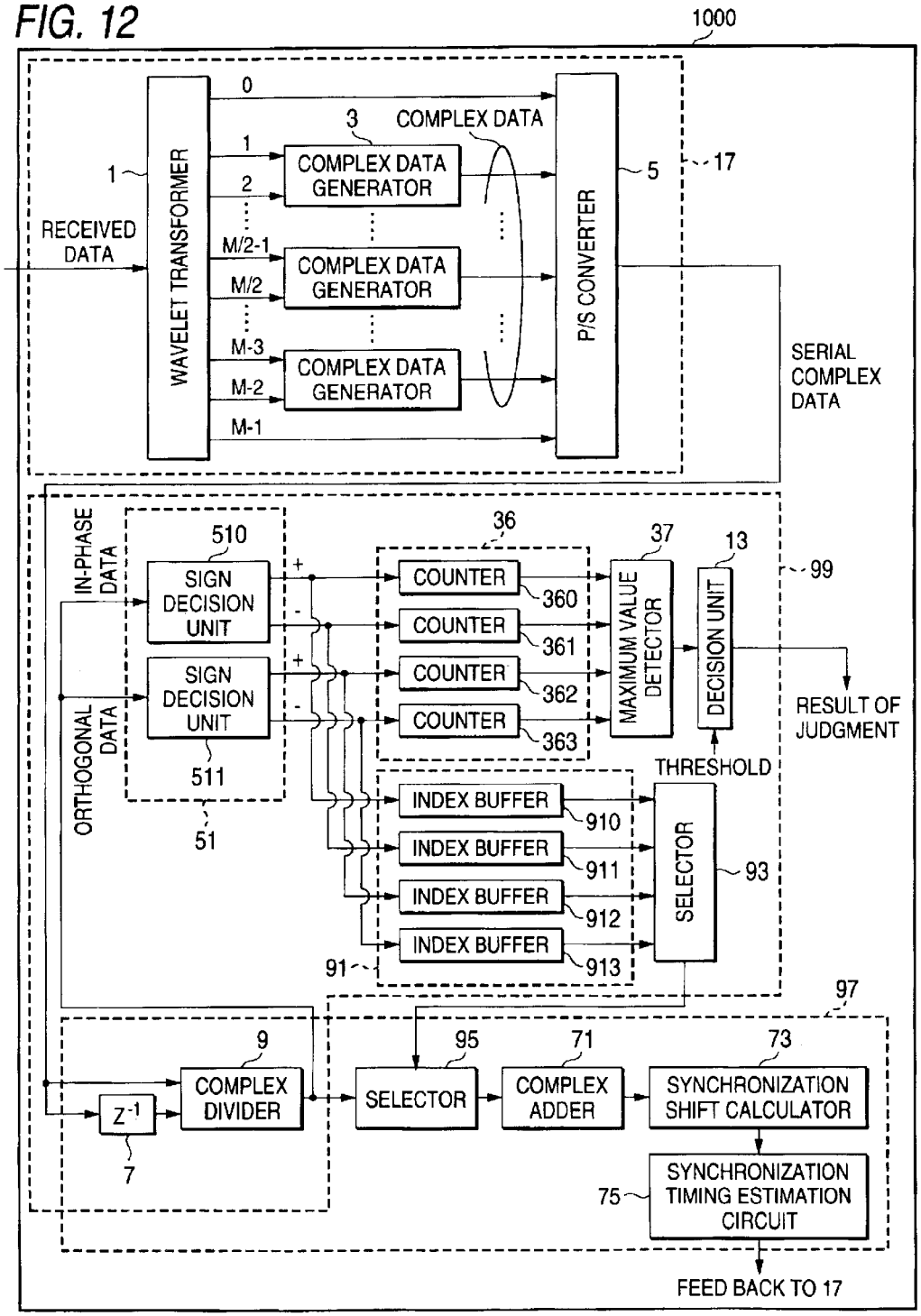
FIG. 12 is a block diagram of a wave detecting portion, a carrier detector and a symbol synchronizing circuit that form a part of a receiving apparatus according to a fifth embodiment of the invention.

In FIG. 12, the receiving apparatus 1000 includes a wave detecting portion 17, a symbol synchronizing circuit 97 and a carrier detector 99. The wave detecting portion of the present embodiment has the same configurations as the wave detecting portion of the first embodiment. In addition, the carrier detector 99 of the present embodiment has the same configurations as the carrier detector of the third embodiment except for the index buffer 91 and a selector 93. Furthermore, the symbol synchronizing circuit 97 of the present embodiment has the same configurations as the symbol synchronizing circuit of the fourth embodiment except for the selector 95. Accordingly, detailed explanations about the same configurations as these embodiments are omitted in this embodiment.

The carrier detector 99 includes a delay element 7, a complex divider 9, a sign decision unit 51, a counter 36, an index buffer 91, a maximal value detector 37, a decision unit 13 and a selector 93.

In this embodiment, there are four index buffers 910 to 913. The index buffers 910 to 913 store each index number "n" ($1 \leq n \leq (M/2-1)$, subcarrier numbers vary from 0 to M−1) of the divided complex data which is counted by each of the counters 360 to 363, respectively. The selector 93 selects the index of the counter that has the maximal value of the four counters 360 to 363.

The symbol synchronizing circuit 97 includes the delay element 7, the complex divider 9, a selector 95, a complex adder 71, a synchronization shift calculator 73 and a synchronization timing estimation circuit 75. As shown in FIG. 12, the delay element 7 and the complex divider 9 are shared by the carrier detector 99 and the symbol synchronizing circuit 97 in this embodiment. The selector 95 selects only the data corresponding to the index selected by the carrier detector 99.

An operation of the receiving apparatus 1000 having such a configuration will now be described with reference to FIG. 12. It is assumed that the data sent from outside of the receiving apparatus 1000 is already known and has the same information, for example all "1".

The operation of the wave detecting portion 17 is the same as the operations described in the first embodiment. In addition, the operations of the symbol synchronizing circuit 97 and the carrier detector 99 are similar to the operations described in the third and fourth embodiments. In the third or fourth embodiment, the sign decision unit 33 or 51 outputs sign data only to the counter 35 or 36. In the carrier detector 99 of this embodiment, however, the sign data output from the sign decision unit 51 is sent to both the counter 36 and the index buffer 91. Accordingly, each of the index buffer 910 to 913 stores index numbers of the divided complex data, which is counted by the counter 360 to 363, respectively. Next, the selector 93 selects one of the index buffers 91 corresponding to the counter that has the maximal value of the four counters 360 to 363. At this time, information of the counter that has the maximal value is fed from the maximal value detector 37 to the selector 93. The selector 93 then outputs the index data of the selected index buffer to the selector 95 in the symbol synchronizing circuit 97. In the symbol synchronizing circuit 97, the selector 95 selects intended complex data from all of the divided complex data output from the complex divider 9 corresponding to the index data from the selector 93, and the selector 95 outputs the intended complex data to the complex adder.

In addition, the carrier detector 99 includes the phase-difference distribution calculator based on the third embodiment, but it can also use the configuration described in the second embodiment as the phase-difference distribution calculator.

The above-described configuration makes it possible to improve the accuracy of estimating the synchronization timing of the symbol synchronizing circuit 97 in comparison with the fourth embodiment. This is possible because the configuration makes it possible to assume the synchronization timing using the divided complex data (the phase differences between the complex subcarriers) which existed in the particular region on the complex coordinate system that phase-difference distributions concentrate.

In addition, the carrier detector 99 and the symbol synchronizing circuit 97 in the present embodiment can be employed with a multi carrier receiving apparatus using Fast Fourier Transform that can handle the complex data.

(Sixth Embodiment)

Figure 13:
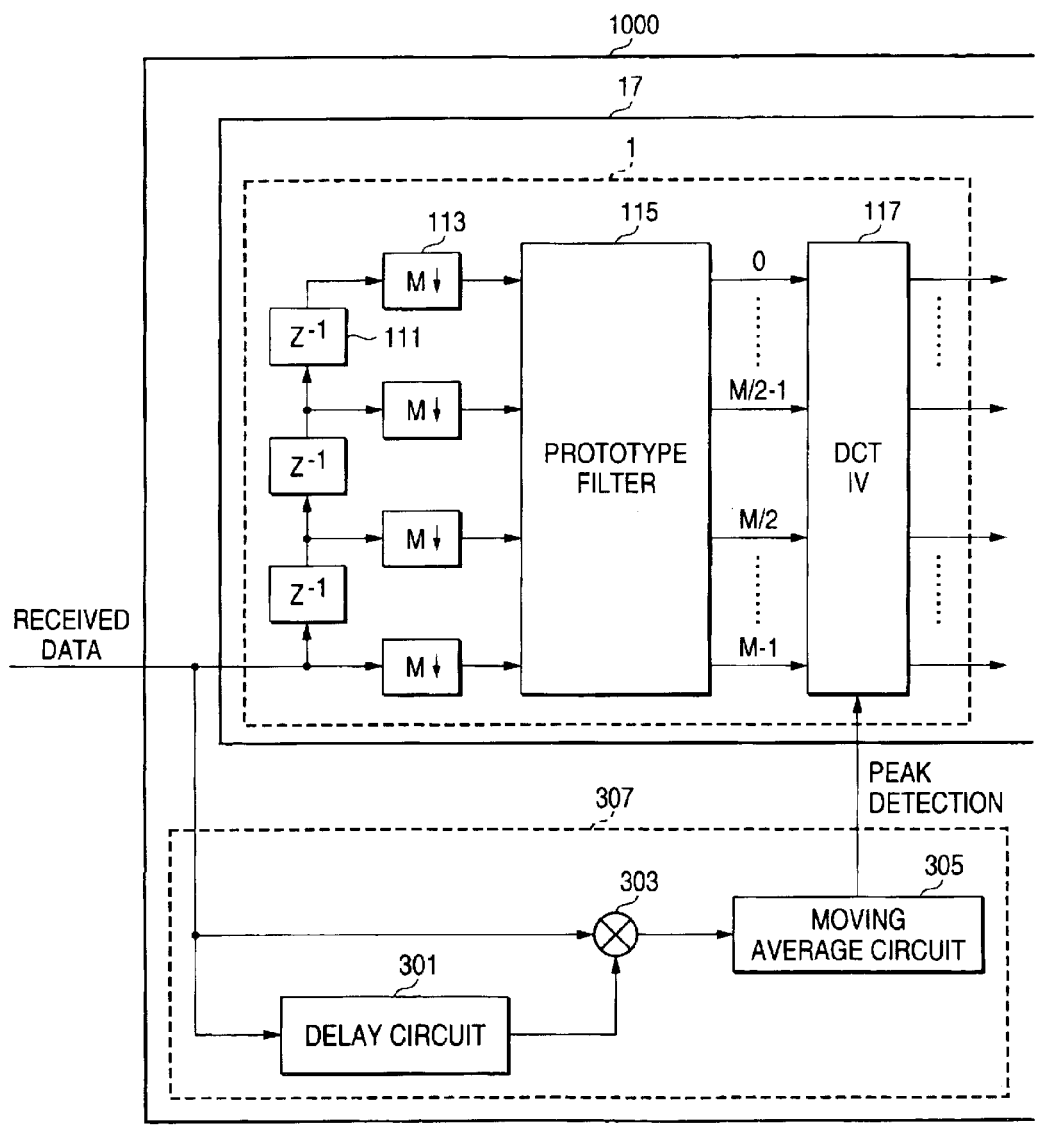
FIG. 13 is a block diagram of a carrier detector and a wave detecting portion with a wavelet transformer that form a part of a receiving apparatus according to a sixth embodiment of the invention.

FIG. 13 is a block diagram of a receiving apparatus according to a sixth embodiment of the invention. A wave detecting portion of the present embodiment has the same configurations as the wave detecting portion shown in FIGS. 11 and 12. In this embodiment, the configuration of the wavelet transformer 1 will be described in detail. Furthermore, a carrier detector 307 will be described which has a different configuration from those in the above-mentioned embodiment 1 to 5.

In FIG. 13, the receiving apparatus 1000 includes the wavelet transformer 1, the wave detecting portion 17, and the carrier detector 307. The wavelet transformer 1 includes delay elements 111, down samplers 113, a prototype filter 115 and a fast discrete cosine transformer (type 4) 117 (Hereinafter called DCT 117). The M−1 delay elements 111 delay received data by one sampling period. The down samplers reduce the sampling rate for received data by a factor of M.

The carrier detector 307 includes a delay element 301, a multiplier 303 and a moving average circuit 305. The delay element 301 delays received data by one symbol period and outputs a delayed data. The multiplier 303 multiplies the received data and the delayed data and outputs a multiplied data. The moving average circuit 305 obtains the moving average to correlate the received data with the delayed data. The moving average circuit 305 outputs a peak detection signal to the DCT 117 when the result of the moving average indicates peak detection.

Figure 14:
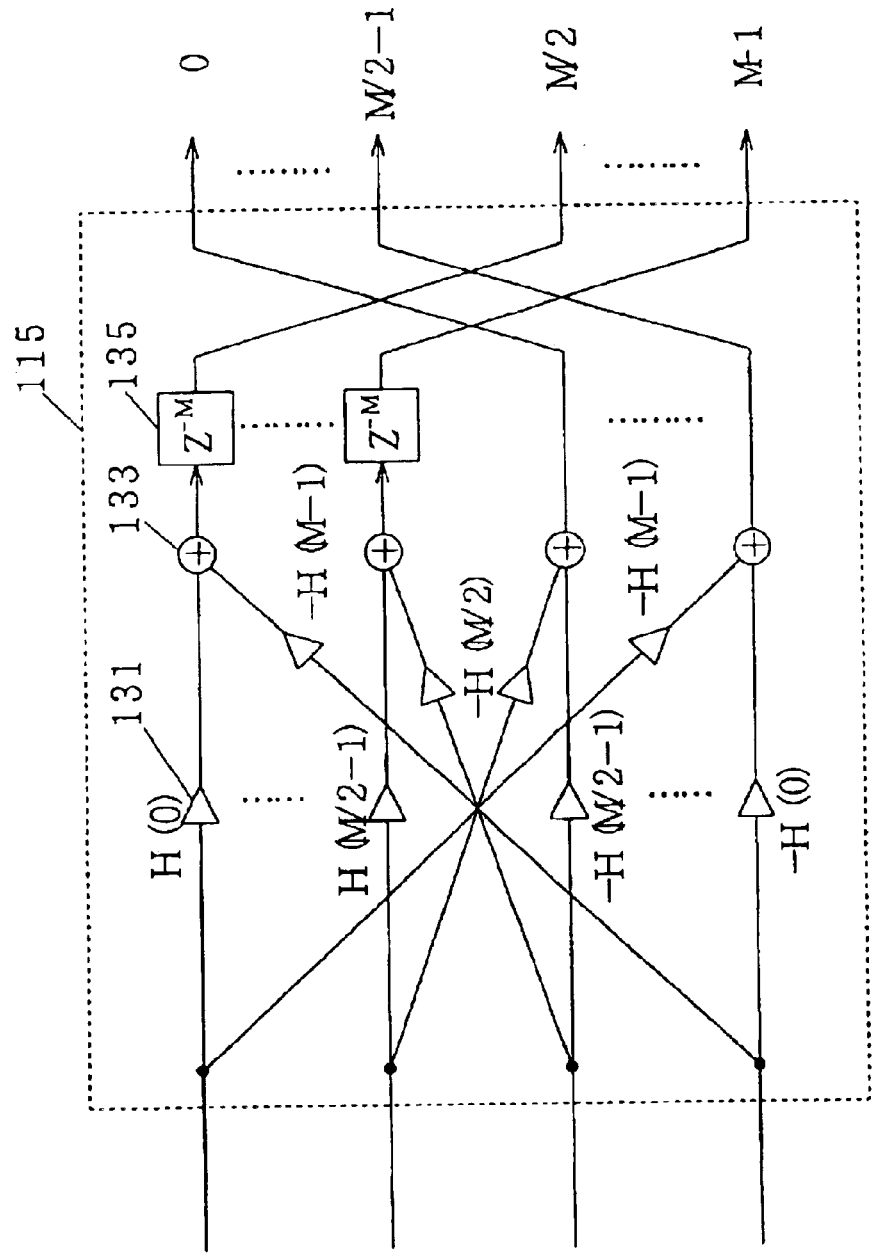
FIG. 14 is a block diagram showing a prototype filter having a polyphase configuration in FIG. 13.

Referring to FIG. 14, a configuration of the prototype filter 115 will now be described in detail. The prototype filter 115 can be a filter having a polyphase configuration and possessing a real coefficient for receiving the down-sampled data. The prototype filter 115 includes an adder 131, a two-input adder 133 and a delay element 135. The adder 131 stores a filter coefficient of the prototype filter 115. The delay element 135 delays the data output from the two-input adder by one sampling period.

An operation of the receiving apparatus 1000 having such a configuration will now be described with reference to FIGS. 13 and 14. It is assumed that data sent from outside of the receiving apparatus 1000 is already known and has the same information, for example all "1".

The data received by the carrier detector 307 is introduced to the delay element 301 and the multiplier 303. The delay element 301 delays the received data by one symbol period to generate delayed data, and outputs the delayed data to the multiplier 303. The multiplier 303 receives the received data from outside and the delayed data from the delay element 301. The Adder 303 multiplies the received data and the delayed data to generate multiplied data, and outputs the multiplied data to the moving average circuit 305. The carrier detector 307 detects a carrier in this manner. The moving average circuit 305 receives the multiplied data and obtains the moving average by utilizing a correlation of the received data with the delayed data on a time basis.

All elements shown in FIG. 13 operate constantly except the DCT 117. The DCT 117 begins to operate when the carrier detector 307 performs carrier detection.

The above-described configuration makes it possible to reduce the transition period from carrier detection to demodulation when the correlation of the data on a time basis is used in the carrier detector. (For example, when DWMC communication is performed by utilizing wavelet transition with four symbols length, it can reduce the period from carrier detection processing to data receiving processing by the period corresponding to three symbols.) In addition, as the DCT 117 does not start to operate until the carrier detector 307 detects intended data (carrier), it can improve power consumption of the receiving apparatus 1000.

(Seventh Embodiment)

Figure 15:
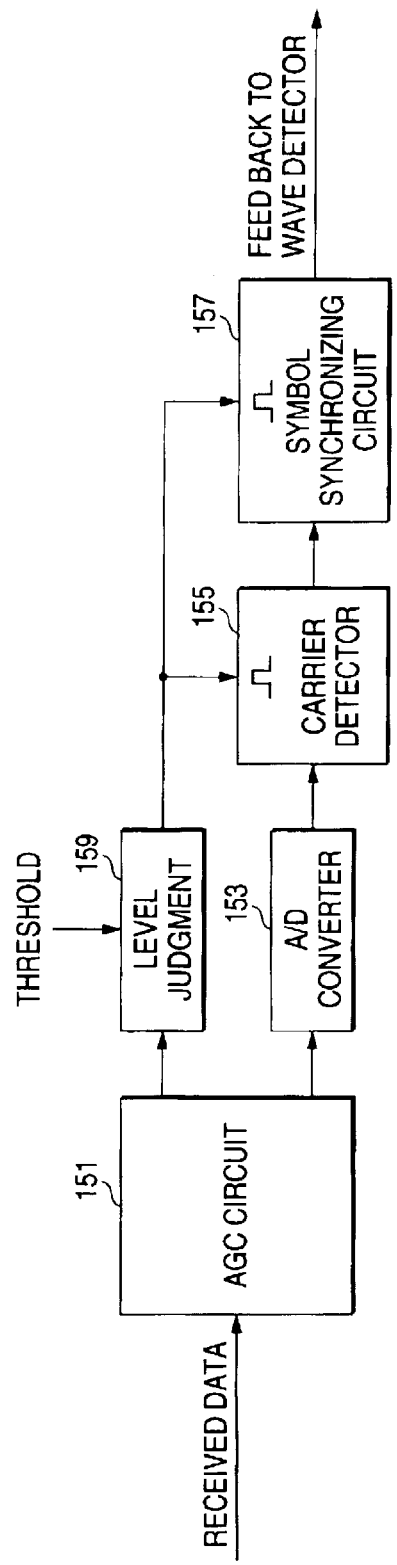
FIG. 15 is a block diagram showing a receiving apparatus according to a seventh embodiment of the invention.

In FIG. 15, the receiving apparatus 1000 includes an auto gain control circuit 151 (hereinafter called AGC 151), an analog to digital converter 153 (hereinafter called A/D converter 153), 155, a symbol synchronizing circuit 157 and a level decision unit 159. Any configurations of the carrier detectors and symbol synchronizing circuits described in embodiments 1 to 6 can be used as the carrier detector 155 and the symbol synchronizing circuit 157, respectively. The level decision unit 159 compares a gain level of the data from AGC 151 with a threshold stored in the decision unit 159. When the gain level is lower than the threshold, the level decision unit 159 outputs "on" information to the carrier detector 155 and the symbol synchronizing circuit 157. The level decision unit 159 outputs "off" information to the carrier detector 155 and the symbol synchronizing circuit 157 when the gain level is not lower than the threshold.

An operation of the receiving apparatus 1000 having such a configuration will now be described with reference to FIG. 15.

When intended data does not exist in the received data, the gain of the AGC 151 is set to a maximal gain. The gain of AGC 151 is set according to a level of the received data when intended data exists in the received data. When intended data exists, the gain of the AGC 151 is set lower than the maximal value.

The level decision unit 159 compares a threshold with the gain level of the AGC 151. When the gain level is higher than the threshold, the level decision unit outputs "OFF" information to the carrier detector 155 and the symbol synchronizing circuits 157 do not operate. The level decision unit 159 outputs "ON" information to the carrier detector 155 and the symbol synchronizing circuits 157 when the gain level is lower than the threshold.

When the "ON" information is input to the carrier detector 155 and the symbol synchronizing circuit 157, the carrier detector 155 and the symbol synchronizing circuit 157 operate to detect carriers and to synchronize symbols, respectively. When the "OFF" information is input to the carrier detector 155 and the symbol synchronizing circuit 157, then the carrier detector 155 and the symbol synchronizing circuit 157 do not operate to detect carriers and to synchronize symbols, respectively.

The above-described configuration makes it possible to improve power consumption of the receiving apparatus 1000 since the carrier detector 155 and the symbol synchronizing circuit 157 operate only when intended data exist in the received data, that is when the "ON" information is input to the carrier detector 155 and the symbol synchronizing circuit 157 from the level decision unit 159.

In addition, though the level decision unit 159 in this embodiment outputs the "ON" or "OFF" information to the carrier detector 155 and the symbol synchronizing circuits 157, the level decision unit 159 can also be employed as follows: when the gain level is higher than the threshold, the level decision unit does not output an operating signal to make the carrier detector 155 and the symbol synchronizing circuits 157 operate. The level decision unit 159 outputs the operating signal when the gain level is lower than the threshold. When the operating signal is input to the carrier detector 155 and the symbol synchronizing circuit 157, the carrier detector 155 and the symbol synchronizing circuit 157 operate to detect carriers and to synchronize symbols, respectively.

(Eighth Embodiment)

Figure 16:
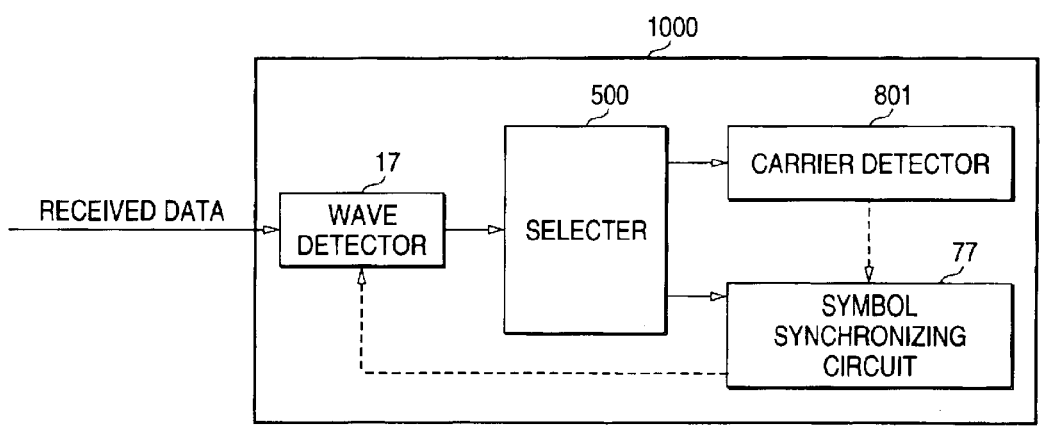
FIG. 16 is a block diagram of a wave detecting portion, a carrier detecting section and a symbol synchronizing circuit that form a part of a receiving apparatus according to a eighth embodiment of the invention.

In FIG. 16, the receiving apparatus 1000 includes a wave detecting portion 17, a carrier detector 801 and a symbol synchronizing circuit 77. The wave detecting portion 17 and the symbol synchronizing circuit 77 have the same configurations as the receiving apparatus of the forth embodiment. Accordingly, the carrier detector 801 will be described at detail in the present embodiment.

An operation of the receiving apparatus 1000 having such a configuration will be described with reference to FIGS. 16 and 17. Generally, when there is a branch in power line and/or a plug outlet is not connected with any other apparatuses, a mismatch of impedance and a reflection will occur in the power line due to the mismatch of impedance. Accordingly, the transmission line in power line communication (hereinafter called PLC) is generally in a bad condition.

Figure 17:
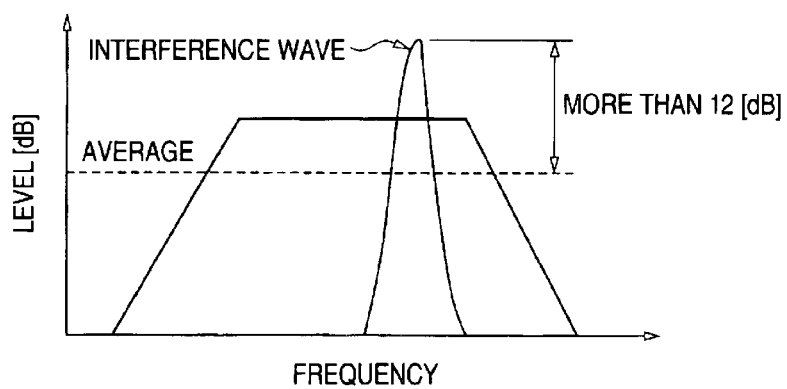
FIG. 17 is a schematic diagram of an example of a signal amplitude spectrum in a power line communication.
Figure 18:
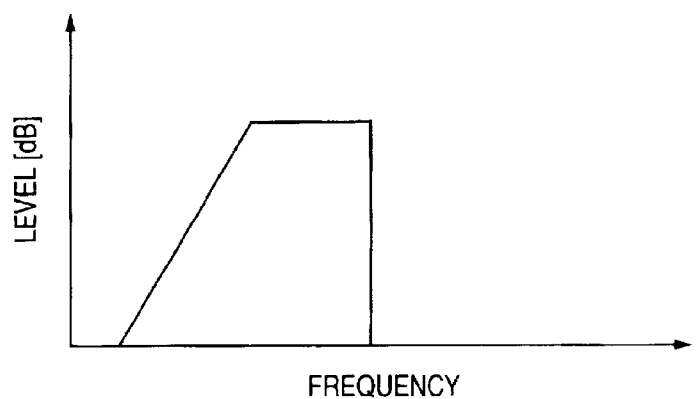
FIG. 18 is a schematic diagram of an example of a signal amplitude spectrum received by a receiving apparatus.

If data has a waveform as shown in FIG. 17 at first, the receiving apparatus 1000 receives the data with a waveform shown in FIG. 18. A threshold for carrier detection is designed corresponding to the data that has an amplitude spectrum shown in FIG. 17. In particular, a number of phase-differences that are found among subcarriers used in the communication is defined as a total number and, for example, the threshold is set to be 70% of the total number (defined as "A"). In a case in which the waveform loses shape as shown in FIG. 18, the carrier detection may not perform in accordance with the value of the threshold even if CNR (ratio of noise power to carrier power) of a part of the amplitude spectrum that does not lose shape is in a good condition.

Accordingly, in order to address this problem, the carrier detector 801 is employed in this embodiment. The carrier detector 801 calculates phase-differences between each of adjacent subcarriers, and calculates a number of phase-differences (complex data) whose values are lower than a particular threshold. This number is defined as "B".

In this embodiment, the threshold is set by using "A" and "B" in view of a condition of a transmission line. For example, in the third embodiment, the threshold is set as (A-0.5*B)*0.7 (called "formula 1"). As the threshold is set in view of a condition of a transmission line, the accuracy of the carrier detection is improved.

When the carrier is detected by using the above-mentioned method in the carrier detector 801, the carrier detector 801 sends detection information to the symbol synchronizing circuit 77. The symbol synchronizing circuit 77 operates according to the detection information, performs symbol synchronization, and produces synchronization information. The synchronization information is fed back to the wave detecting portion 17.

In addition, though the third embodiment is used as an example of a way to calculate a threshold in this embodiment, a different method for calculating a threshold can be employed in other embodiments or cases if "A" and "B" are changed in view of the condition of each of the transmission lines. This configuration makes it possible to improve the accuracy of carrier detection for almost all of the other cases. Furthermore, this configuration can be employed in other communication methods using cables such as, for example, a telephone line or a preexisting coaxial line. Nearly the same effects will be obtained in these communication methods when this configuration is employed.

(Ninth Embodiment)

Figure 19:
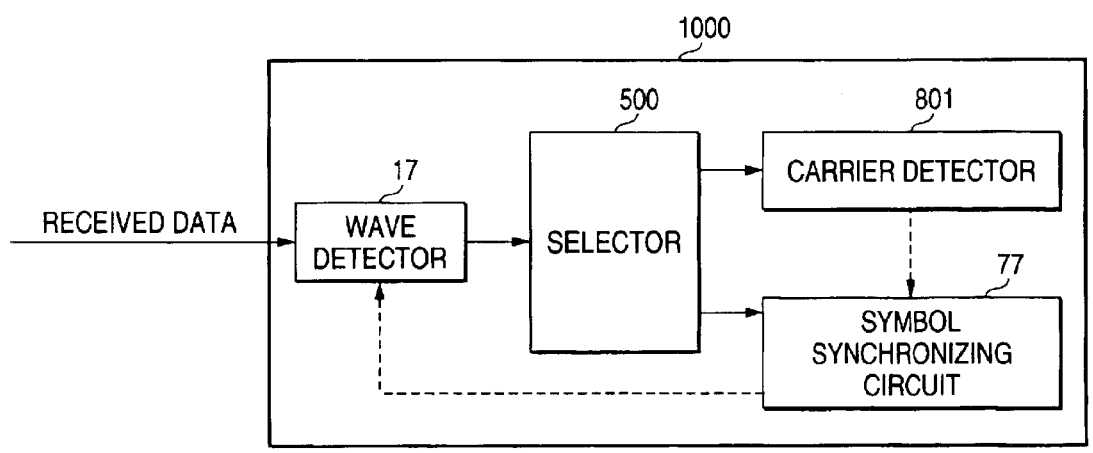
FIG. 19 is a block diagram of a wave detecting portion, a selector, a carrier detector and a symbol synchronizing circuit that form a part of a receiving apparatus according to a ninth embodiment of the invention.

In FIG. 19, the receiving apparatus 1000 includes a wave detecting portion 17, a selector 500, a carrier detector 801 and a symbol synchronizing circuit 77. The wave detecting portion 17 and the symbol synchronizing circuit 77 have the same configurations as the receiving apparatus of the eighth embodiment. Accordingly, the selector 500 and a whole operation of the present embodiment will be described in detail.

As mentioned earlier, when there is a branch in power line and/or a plug outlet is not connected with any other apparatuses, a mismatch of impedance and a reflection will occur in the power line due to the mismatch of impedance. Accordingly, the transmission line in PLC is generally in a bad condition.

In particular, interference from other preexisting systems such as a ham radio and short-wave broadcasting becomes a problem in the PLC and a bad condition in the transmission line. The complex data is employed in the carrier detector 801 and the symbol synchronizing circuit 77 shown in the fourth embodiment. By using the complex data, when interference from another system exists in the PLC and the level of the interference is high, the result of the calculation in the carrier detector 801 and the symbol synchronizing circuit 77 have a large margin of error. This large margin of error could have bad influences to the PLC. In order to reduce the large margin of error, the receiving apparatus 1000 in the present embodiment includes the selector 500. The selector 500 selects intended data from the complex data output from the wave detecting portion 17 by way of removing subcarriers that have large differences from the average level of the complex data. Subcarriers that have large differences from the average level of the complex data are more likely to be interference waves with a high level. The average level of the complex data is derived to average the levels of all subcarriers. In the present embodiment, if the difference from the average level is larger than the 12 db, then the subcarrier is removed in the selector 500. The removed subcarriers are not sent to the carrier detector 801 and the symbol synchronizing circuit 77. This configuration makes it possible to improve the accuracy of the carrier detector 801 and the symbol synchronizing circuit 77.

In addition, the 12 db threshold (12 db) can be changed according to conditions such as the condition of transmission line or the accuracy of the carrier detector 801 and the symbol synchronizing circuit 77.

Figure 20:
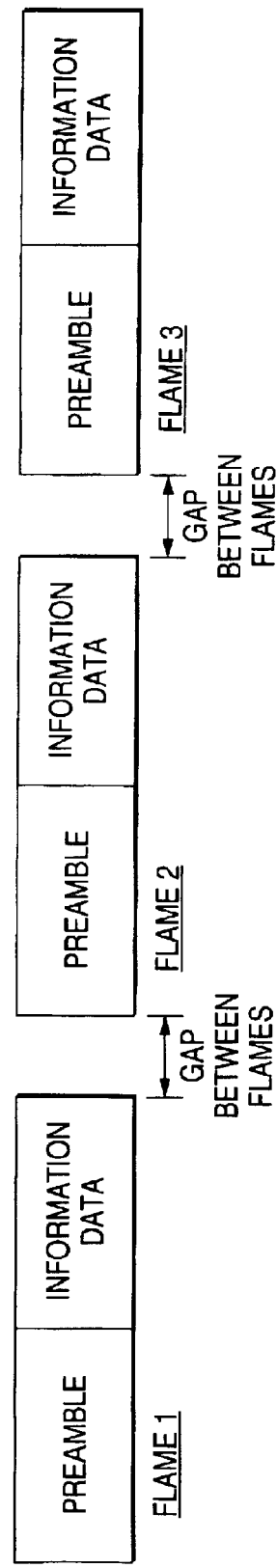
FIG. 20 is a schematic diagram showing transmission of frames.

Furthermore, when the above-mentioned operation is performed in a data block (within a frame) in which the data is exchanging, the selector 500 can detect whether narrow-band interferences that have a level which is 12 db higher than the average level exist or not. However, it is difficult to detect whether narrow-band interferences that have the same levels as the average level exist or not. The existence of narrow-band interferences that have the same levels as the average level could have bad influences to the PLC. In order to reduce this bad influence, it is more preferable that the operation is performed in a no data block (in between a frame, or in a gap between frames). As shown in FIG. 20, each of frames "A", "B" and "C" includes a preamble portion and a data portion. A gap between adjacent frames is provided to prevent adjacent frames from overlapping. The gap can be detected retroactively when the carrier is detected. This configuration makes it possible to improve the detection accuracy of the narrow-band interferences that frequently exist. As a result, the processing capacity is improved in the receiving apparatus 1000 when performing the carrier detection or the symbol synchronization using the complex data output from the wave detecting portion.

In addition, this configuration can be employed in other communication methods using cables such as, for example, a telephone line or a preexisting coaxial line. Almost the same effects will be obtained in these communication methods when this configuration is employed.

In addition, the carrier detector in the present embodiment is not to be considered limited to a multi-carrier receiving apparatus using a complex wavelet transform, but can be employed with a multi-carrier receiving apparatus using Fast Fourier Transform (hereinafter called FFT) that can handle the complex data. The receiving apparatus with FFT will be described in detail below.

Figure 21:
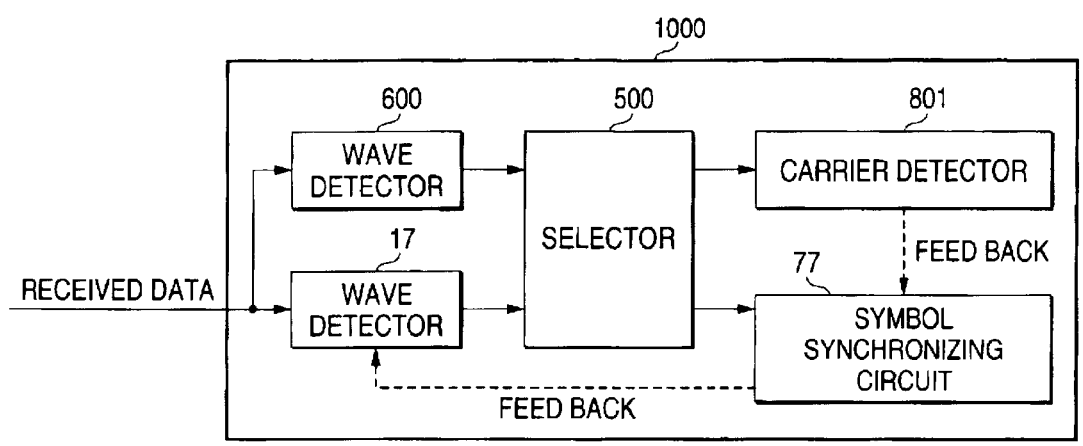
FIG. 21 is a block diagram of a receiving apparatus utilizing a fast Fourier transform according to a ninth embodiment of the invention.

In FIG. 21, the receiving apparatus 1000 includes a wave detecting portion 17, a wave detecting portion 600, a selector 500, a carrier detector 801 and a symbol synchronizing circuit 77. The wave detecting portion 17, the selector 500, the carrier detector 801 and the symbol synchronizing circuit 77 have the same configurations as the above-mentioned receiving apparatus. An operation of the receiving apparatus 1000 is close to the operation of the above-mentioned receiving apparatus with regard to the preamble portion. Accordingly, the wave detecting portion 600 will be described in detail in the present embodiment. The wave detecting portion 600 detects waves using FFT instead of the wavelet transformer that outputs complex data.

A sending apparatus (not shown in FIG. 21) generates preamble data with an inverse wavelet transformer. The preamble data is an associated wave comprising a plurality of sine waves. Accordingly, the wave detecting portion 600 using FFT can detect narrow-band interference. Similarly, the wave detecting portion 17 can also detect narrow-band interference.

An operation of the receiving apparatus 1000 having such a configuration will be described in detail with reference to FIG. 21.

If the gap between frames is more than 4 times as long as a length of a symbol, then the detection of the narrow-band interference can be performed in the gap between frames more accurately when a length of a wavelet filter is, for example, more than 4 times as long as a length of the symbol. However, if the gap is less than 4 times as long as a length of symbol, then the accuracy of the detection of the narrow-band interference will degrade in the receiving apparatus 1000 because the detection of the narrow-band interference is carried out in a condition such that a part of a frame is included in the filter.

However, when the wave detecting portion 600 using FFT is employed, the gap needs to be at least more than one symbol length because the filter length is almost the same as the symbol length in FFT. Accordingly, when the detection of the narrow-band interference is performed in the gap between frames, the gap using FFT can be smaller than the gap using wavelet in the DWMC transmission method in which a filter length is longer than a symbol length. This configuration makes it possible to improve the data transmission efficiency of the receiving apparatus.

In addition, this configuration can employ the systems in which a filter length is longer than a symbol length such as, for example, OFDM/OQAM or Filtered OFDM.

Furthermore, FFT can be employed in the wave detecting portion 17 (in particular, for processing of the fast discrete cosine transformer (type 4) 117). Accordingly, when both the wave detecting portion 17 and the wave detecting portion 600 include a common FFT, this configuration makes it possible to simplify the structure of the circuit of the receiving apparatus as shown in FIG. 21.

(Tenth Embodiment)

Figure 22:
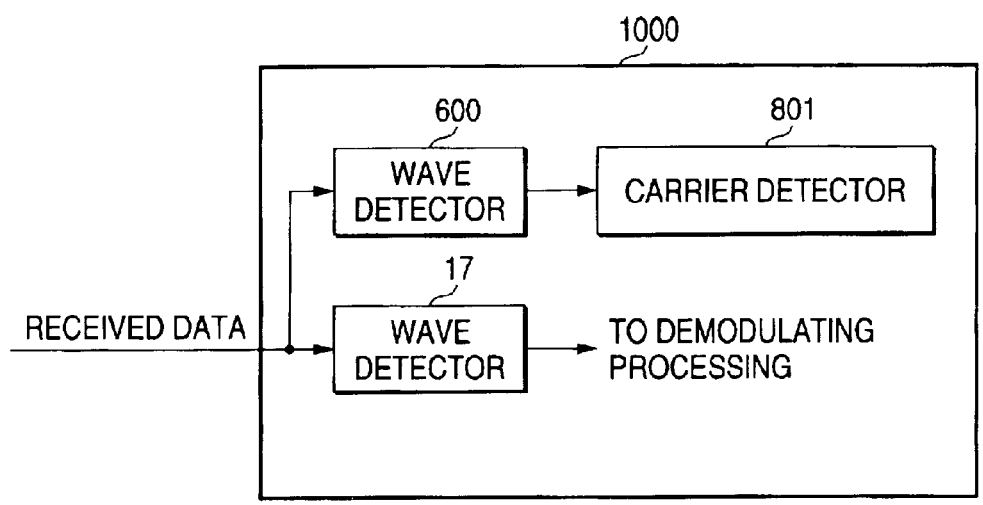
FIG. 22 is a block diagram of a wave detecting portion and a carrier detector that form a part of a receiving apparatus according to a tenth embodiment of the invention.
Figure 23:
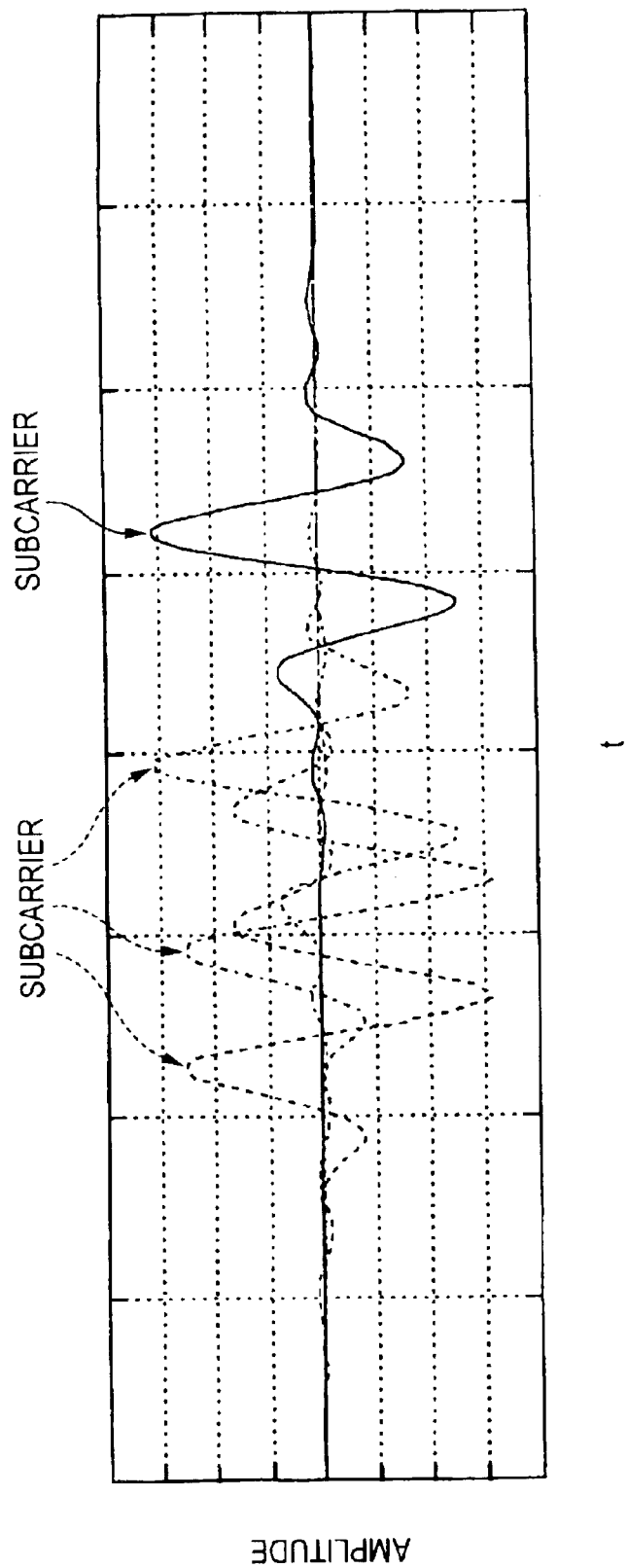
FIG. 23 is a waveform diagram showing an example of a wavelet waveform.
Figure 24:
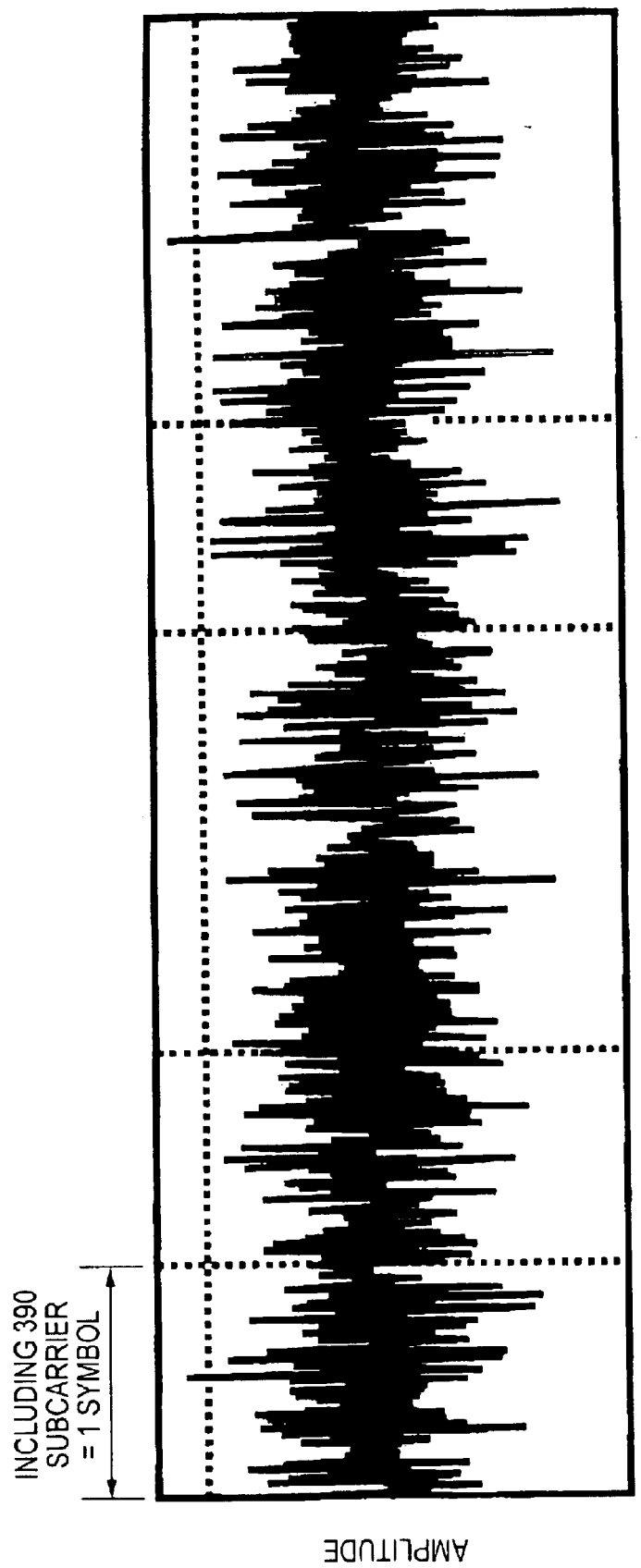
FIG. 24 is a waveform diagram showing an example of a waveform transmitted according to the DWMC transmission method.
Figure 25:
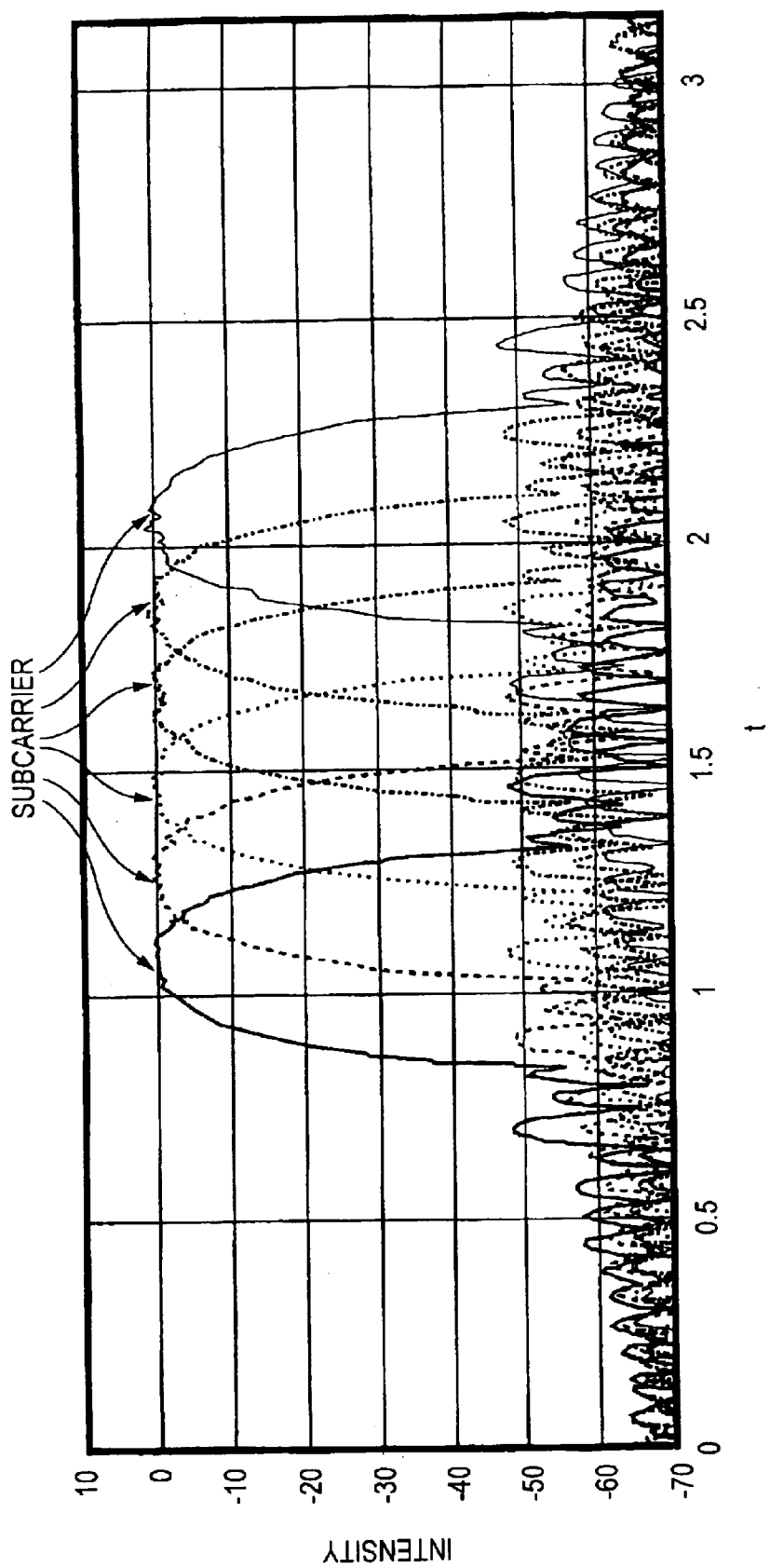
FIG. 25 is a spectrum diagram showing an example of a spectrum transmitted according to the DWMC transmission method.
Figure 26:
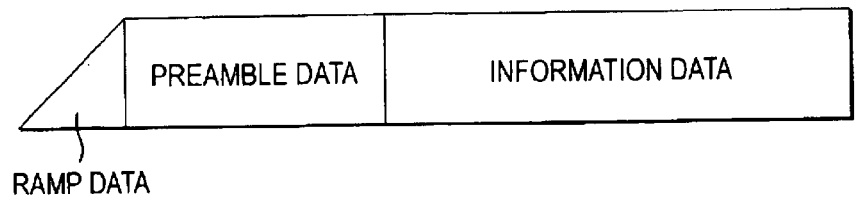
FIG. 26 is a schematic frame diagram showing an example of a configuration of a frame transmitted according to the DWMC transmission method.

In FIG. 22, the wave detecting portions 17 and 600 and the carrier detector 801 have the same configurations as the receiving apparatus of the ninth embodiment.

An operation of the receiving apparatus in the present embodiment will be described with reference to FIG. 22. In FIG. 19, the wave detecting portion 600 detects subcarriers using FFT. The structure of a frame has the same structure as shown in FIG. 20.

When the wave detecting portion 17 using an ordinary wavelet transformer performs the carrier detection, the carrier detection is carried out with the wavelet-transformed data used by waveforms corresponding to time of a filter length. In this case, the wavelet-transformed data output from the wave detecting portion include the wavelet-transformed Ramp data for performing Ramp processing. Generally, the AGC processing (in particular, a step-like gain control) using the Ramp data is carried out in the receiving apparatus. Accordingly, the accuracy of the carrier detection will degrade as the wavelet-transformed Ramp data is included in the wavelet-transformed data. In order to prevent the wavelet-transformed data from degrading, the length of the preamble needs to be sufficiently long. However, the usability of the frequency will degrade in this case.

In the present embodiment, the carrier detection employs the Fourier-transformed data output from the wave detecting portion 600 using FFT. The wave detection by way of using FFT makes it possible to perform Fourier-transformation for each of the symbols. The carrier detection can be performed after the operation of the AGS, which operates at the head of a flame, becomes stable.

Accordingly, the accuracy of the carrier detection can be improved by using the Fourier-transformed data output from the wave detecting portion 600 using FFT because the Fourier-transformed data output from the wave detecting portion 600 includes few nonlinear-processed data.

In addition, this configuration can employ the systems in which a filter length is longer than a symbol length such as, for example, OFDM/OQAM or Filtered OFDM.

Furthermore, FFT can be employed in the wave detecting portion 17 (in particular, for processing of the fast discrete cosine transformer (type 4) 117). Accordingly, when both the wave detecting portion 17 and the wave detecting portion 600 include a common FFT, this configuration makes it possible to simplify the structure of the circuit of the receiving apparatus as shown in FIG. 22.

In addition, though the wave detecting portion 17 includes a wavelet transformer in the first to tenth embodiments, the wave detecting portion 17 can also include two or more wavelet transformers.

Furthermore, although the real wavelet filter is described in the first to tenth embodiments, other wavelet filters and systems in which the length of filter is longer than length of a symbol such as, for example, OFDM/OQAM or Filtered OFDM can be employed instead of the real wavelet filter.

In addition, the configurations of the first to tenth embodiments can be combined with each other as needed.

The receiving apparatus described in the first to tenth embodiment can obtain complex data by performing less calculations. In addition, the receiving apparatus described in the first to tenth embodiments can perform the carrier detection in the frequency domain using a distribution of phase-differences between carriers. Furthermore, the receiving apparatus described in the first to tenth embodiments makes it possible to simplify the structure of the circuit of the receiving apparatus. In addition, the receiving apparatus described in the first to tenth embodiments make it possible to reduce an influence of the narrow-band interference wave.

In the first through tenth embodiments, an IC (integrated circuit) chip is used as the wave detecting portions, the carrier detectors and the symbol synchronizing circuits of the apparatus 1000. Although the IC chip is an FPGA (field programmable gate array), an ASIC (application specific integrated circuit) may be used instead. Furthermore, it may be possible to use a plurality of IC chips for the functional blocks, such as the wave detecting portions, the carrier detectors and the symbol synchronizing circuits of the apparatus 1000.

CROSS REFERENCE TO RELATED APPLICATION

This application is based upon and claims the benefit of priority of Japanese Patent Application No. 2003-41118 filed on Feb. 19, 2003 and No. 2003-345408 filed on Oct. 3, 2003, the contents of which are incorporated herein by reference in its entirety.

DRAWINGS

FIG. 1

1 Wavelet transformer

3 Complex data generator

5 P/S converter

11 Phase-difference distribution calculator

13 Decision unit

5 FIG. 8

330, 331 Sign decision unit

350–357 Counter

37 Maximum value detector

FIG. 11

1 Wavelet transformer

3 Complex data generator

5 P/S converter

79 Phase-difference distribution calculator

13 Decision unit

9 Complex divider

71 Complex adder

73 Synchronization shift calculator
75 Synchronization timing estimation circuit
FIG. 12
93, 95 Selector
FIG. 13
305 Prototype filter
FIG. 15
151 auto gain control circuit
153 A/D converter
155 carrier detector
157 symbol synchronizing circuit
159 level decision unit
FIG. 16
17 wave detecting portion
801 carrier detector
77 symbol synchronizing circuit
FIG. 18
500 selector

What is claimed is:

1. A receiving apparatus employing a digital multi-carrier transmission method utilizing a real coefficient wavelet filter bank, said apparatus comprising:

a complex data output device for performing a wavelet transform of received data and outputting complex data;

a delay element for delaying the complex data for one sampling period and outputting delayed complex data;

a complex divider for dividing the complex data and the delayed complex data, and for outputting divided complex data, wherein the divided complex data expresses a phase difference between complex subcarriers;

a phase-difference distribution calculator for calculating a number of the divided complex data present within each of plural quadrants on orthogonal coordinates and selecting a maximal number among the calculated numbers; and a decision unit for deciding whether the received data is intended data by comparing the maximal number and a threshold number.

2. The receiving apparatus according to claim 1, wherein said complex data output device comprises:

a wavelet transformer including M real coefficient wavelet filters (M is a positive integer), which are orthogonal with respect to each other, for performing a wavelet transform of the received data;

a complex data generator for generating complex data by defining (2n−1)th outputs (n is a positive integer) from said wavelet transformer as in-phase components of complex information and 2n-th outputs ($1 \leq n \leq (M/2-1)$) and subcarriers are numbered from 0 to M−1) from said wavelet transformer as orthogonal components of the complex information, and outputting parallel complex data; and a parallel to serial converter for converting the parallel complex data output from said complex data generator to serial complex data and outputting the serial complex data.

3. The receiving apparatus according to claim 1, wherein said phase-difference distribution calculator comprises:

a shifter for shifting a phase of the divided complex data by π/4;

a sign decision unit for performing a decision of a sign of the divided complex data;

a plurality of counters for counting a number of divided complex data points distributed to each of the plural quadrants and outputting the counted numbers; and a maximal number detector for detecting the maximal number among the counted numbers output from said plurality of counters.

4. The receiving apparatus according to claim 1, wherein said phase-difference distribution calculator comprises:

a sign decision unit for performing a decision of a sign of both in-phase components of the divided complex data and orthogonal components of the divided complex data;

a plurality of counters for counting a number of each of the signs output from said sign decision unit and outputting the counted numbers; and a maximal number detector for detecting a maximal number among the counted numbers outputted from said plurality of counters.

5. A receiving apparatus employing a digital multi-carrier transmission method utilizing a real coefficient wavelet filter bank, said apparatus comprising:

a complex data output device for performing a wavelet transform of received data and outputting complex data;

a delay element for delaying the complex data for one sampling period and outputting delayed complex data;

a complex divider for dividing the complex data and the delayed complex data, and for outputting divided complex data, wherein the divided complex data expresses a phase difference between complex subcarriers;

a phase-difference distribution calculator for calculating a number of the divided complex data present within each of plural quadrants on orthogonal coordinates and selecting a maximal number among the calculated numbers;

a decision unit for deciding whether the received data is intended data by comparing the maximal number and a threshold number;

a complex adder for adding the divided complex data to obtain accumulated data and for obtaining an average value from the accumulated data;

a synchronization shift calculator for calculating a value of synchronization shift utilizing the average value; and a synchronization timing estimation circuit for estimating a probable synchronization timing from the value of synchronization shift and for feeding back the synchronization timing to said complex data output device.

6. The receiving apparatus according to claim 5, wherein said complex data output device comprises:

a wavelet transformer including M real coefficient wavelet filters (M is a positive integer), which are orthogonal with respect to each other, for performing a wavelet transform of the received data;

a complex data generator for generating complex data by defining (2n−1)th outputs (n is a positive integer) from said wavelet transformer as in-phase components of complex information and 2n-th outputs ($1 \leq n \leq (M/2-1)$) and subcarriers are numbered from 0 to M−1) from said wavelet transformer as orthogonal components of the complex information, and outputting parallel complex data; and a parallel to serial converter for converting the parallel complex data outputted from said complex data generator to serial complex data and outputting the serial complex data.

7. A receiving apparatus employing a digital multi-carrier transmission method utilizing a real coefficient wavelet filter bank, said apparatus comprising:
- a wavelet transformer including M real coefficient wavelet filters (M is a positive integer), which are orthogonal with respect to each other, for performing a wavelet transform of the received data;
- a complex data generator for generating complex data by defining (2n−1)th outputs (n is a positive integer) from said wavelet transformer as in-phase components of complex information and 2n-th outputs ($1 \leq n \leq (M/2-1)$ and subcarriers are numbered from 0 to M−1) from said wavelet transformer as orthogonal components of the complex information, and outputting parallel complex data;
- a parallel to serial converter for converting the parallel complex data outputted from said complex data generator to serial complex data;
- a delay element for delaying the serial complex data outputted by said parallel to serial converter for one sampling period and outputting delayed complex data;
- a complex divider for dividing the serial complex data and the delayed complex data, and for outputting divided complex data, wherein the divided complex data expresses a phase difference between complex subcarriers;
- a sign decision unit for performing a decision of a sign of both in-phase components of the divided complex data and orthogonal components of the divided complex data;
- a plurality of counters for counting a number of each of the signs output from said sign decision unit;
- a plurality of index buffers for storing n indexes ($1 \leq n \leq (M/2-1)$, subcarrier numbers vary from 0 to M−1) of the divided complex data corresponding to each of the signs output from said sign decision unit;
- a maximal number detector for detecting a maximal number from the numbers output from said plurality of counters;
- a selector for selecting indexes corresponding to the detected maximal number;
- a decision unit for deciding whether the received data is intended data by comparing the maximal number and a threshold number;
- a selector for selecting a part of the divided complex data corresponding to the selected indexes;
- a complex adder for adding the divided complex data selected by said selector to obtain accumulated data and for obtaining an average value from the accumulated data;
- a synchronization shift calculator for calculating a value of synchronization shift utilizing the average value; and
- a synchronization timing estimation circuit for estimating a probable synchronization timing from the value of synchronization shift and for feeding back the synchronization timing to said complex data output device.

8. A receiving apparatus employing a digital multi-carrier transmission method utilizing a real coefficient wavelet filter bank, said apparatus comprising:
- a wavelet transformer for performing a wavelet transform of received data; and
- a carrier detector for detecting a carrier from the received data;
- wherein said wavelet transformer includes:
  - M−1 one-sample delay elements (M is positive integer more than 2) for delaying the received data sequentially for one sampling period;
  - M down samplers for down-sampling the received data and the sequentially delayed data;
  - a prototype filter having a polyphase configuration and possessing a real coefficient for receiving the down-sampled data; and
  - M points fast Fourier transformer for performing a fast Fourier transform to the filtered data output from said prototype filter; and
- wherein said carrier detector includes:
  - a one-symbol delay element for delaying the received data by one-symbol period;
  - an multiplier for multiplying the received data and the one-symbol delayed data; and
  - a one-symbol moving average circuit for receiving the added data and obtaining the moving average by correlating the received data with the delayed data.

9. A receiving apparatus employing a digital multi-carrier transmission method utilizing a real coefficient wavelet filter bank, said apparatus comprising:
- an auto gain control circuit for automatically controlling a gain of received data;
- a level decision unit for level deciding by comparing a gain level of data received from said auto gain control circuit and a threshold level;
- an analog to digital converter for converting analog data output from said auto gain control circuit to digital data;
- a carrier detector for deciding whether the digital data received from said analog to digital converter is intended data based on the level decided by said level decision unit; and
- a symbol synchronizing circuit for synchronizing the received data output from said carrier detector.

10. A receiving apparatus employing a digital multi-carrier transmission method utilizing a real coefficient wavelet filter bank, said apparatus comprising:
- a wave detecting portion for performing a wavelet transform to received data;
- a carrier detection circuit for detecting a carrier utilizing data output from said wave detecting portion and a threshold which can be changed according to a condition of transmission line; and
- a symbol synchronizing circuit for estimating synchronization timing utilizing data output from said carrier detection circuit.

11. A receiving apparatus employing a digital multi-carrier transmission method utilizing a real coefficient wavelet filter bank, said apparatus comprising:
- a wave detecting portion for performing a wavelet transform to received data;
- a selector for selecting subcarriers according to a signal level of data output from said wave detecting portion;
- a carrier detection circuit for performing a carrier detection utilizing the subcarrier selected by said selector; and
- a symbol synchronizing circuit for estimating synchronization timing utilizing the subcarrier selected by said selector.

12. A receiving apparatus employing a digital multi-carrier transmission method utilizing a real coefficient wavelet filter bank, said apparatus comprising:

a wave detecting portion for performing a wavelet transform to received data;

a selector for selecting subcarriers according to a signal level of a gap between adjacent frames of data output from said wave detecting portion;

a carrier detection circuit for performing a carrier detection utilizing the subcarrier selected by said selector; and a symbol synchronizing circuit for estimating synchronization timing utilizing the subcarrier selected by said selector.

13. A receiving apparatus employing a digital multi-carrier transmission method utilizing a real coefficient wavelet filter bank, said apparatus comprising:

a first wave detecting portion for performing a wavelet transform to received data;

a second wave detecting portion for performing a Fourier transform to received data;

a selector for selecting subcarriers according to a signal level of a gap between adjacent frames of data output from said second wave detecting portion;

a carrier detection circuit for performing a carrier detection utilizing the subcarrier selected by said selector; and a symbol synchronizing circuit for estimating synchronization timing utilizing the subcarrier selected by said selector.

14. A receiving apparatus employing a digital multi-carrier transmission method utilizing a real coefficient wavelet filter bank, said apparatus comprising:

a first wave detecting portion for performing a wavelet transform to received data;

a second wave detecting portion for performing a Fourier transform to received data;

a selector for selecting subcarriers according to a signal level of a gap between adjacent frames of data output from said second wave detecting portion;

a carrier detection circuit for performing a carrier detection utilizing the subcarrier selected by said selector; and a symbol synchronizing circuit for estimating synchronization timing utilizing the data output from said first wave detecting portion.

15. The receiving apparatus according to claim 13, wherein both of said first wave detecting portion and said second wave detecting portion share a common fast Fourier transformer.

16. A receiving apparatus employing a digital multi-carrier transmission method, said apparatus comprising:

a data transforming device for transforming received data to transformed data utilizing a wavelet transform;

a delay element for producing delayed data by delaying the transformed data;

a subcarrier-pair generating device for generating a subcarrier pair from the transformed data and the delayed data;

a phase-difference calculator for calculating a phase-difference between subcarrier-pairs; and a decision unit for deciding received data based on the phase-difference calculated by said phase-difference calculator.

17. The apparatus according to claim 14, wherein both of said first wave detecting portion and said second wave detecting portion share a common fast Fourier transformer.

18. A receiving apparatus employing a digital multi-carrier transmission method utilizing a real coefficient wavelet filter bank, said apparatus comprising:

a complex data output means for performing a wavelet transform of received data and outputting complex data;

a delay means for delaying the complex data for one sampling period and outputting delayed complex data;

a dividing means for dividing the complex data and the delayed complex data, and for outputting divided complex data, wherein the divided complex data expresses a phase difference between complex sub-carriers;

a calculation means for calculating a number of the divided complex data present within each of plural quadrants on orthogonal coordinates and selecting a maximal number among the calculated numbers; and a decision means for deciding whether the received data is intended data by comparing the maximal number and a threshold number.

19. The receiving apparatus according to claim 18, wherein said complex data output means comprises:

M real coefficient wavelet filtering means (M is a positive integer), which are orthogonal with respect to each other, for performing a wavelet transform of the received data;

a complex data generating means for generating complex data by defining (2n−1)th outputs (n is a positive integer) from said wavelet filtering means as in-phase components of complex information and 2n-th outputs ($1 \leq n \leq (M/2-1)$ and sub-carriers are numbered from 0 to M−1) from said wavelet filtering means as orthogonal components of the complex information, and outputting parallel complex data; and a converting means for converting the parallel complex data output from said complex data generating means to serial complex data and outputting the serial complex data.

20. The receiving apparatus according to claim 18, wherein said calculation means comprises:

a shifting means for shifting a phase of the divided complex data by $\pi/4$;

a decision means for performing a decision of a sign of the divided complex data;

a counting means for counting a number of divided complex data points distributed to each of the plural quadrants and outputting the counted numbers; and a detecting means for detecting the maximal number among the counted numbers outputted from said plurality of counting means.

21. The receiving apparatus according to claim 18, wherein said calculation means comprises:

a decision means for performing a decision of a sign of both in-phase components of the divided complex data and orthogonal components of the divided complex data;

a counting means for counting a number of each of the signs output from said decision means and outputting the counted numbers; and a detecting means for detecting a maximal number among the counted numbers outputted from said counting means.

22. A method for receiving data from a digital multi-carrier transmission utilizing a real coefficient wavelet filter bank, said method comprising:

performing a wavelet transform of received data and outputting complex data;

delaying the complex data for one sampling period and outputting delayed complex data;

dividing the complex data and the delayed complex data, and outputting divided complex data, wherein the divided complex data expresses a phase difference between complex sub-carriers;

calculating a number of the divided complex data present within each of plural quadrants on orthogonal coordinates and selecting a maximal number among the calculated numbers; and deciding whether the received data is intended data by comparing the maximal number and a threshold number.

23. The method according to claim 22, wherein said performing wavelet transform of received data and outputting complex data comprises:

performing a wavelet transform of the received data using M real coefficient wavelet filters (M is a positive integer) which are orthogonal with respect to each other;

generating complex data by defining (2n−1)th outputs (n is a positive integer) from the wavelet filters as in-phase components of complex information and 2n-th outputs ($1 \leq n \leq (M/2-1)$ and sub-carriers are numbered from 0 to M−1) from the wavelet filters as orthogonal components of the complex information, and outputting parallel complex data; and converting the parallel complex data output from said generating to serial complex data and outputting the serial complex data.

24. The method according to claim 22, wherein said calculating comprises:

shifting a phase of the divided complex data by $\pi/4$;

performing a decision of a sign of the divided complex data;

counting a number of divided complex data points distributed to each of the plural quadrants and outputting the counted numbers; and detecting the maximal number among the counted numbers outputted in said counting.

25. The method according to claim 22, wherein said calculating comprises:

performing a decision of a sign of both in-phase components of the divided complex data and orthogonal components of the divided complex data;

counting a number of each of the signs output in said performing decision and outputting the counted numbers; and detecting a maximal number among the counted numbers outputted in said counting.

* * * * *